(12) United States Patent
Chhibber et al.

(10) Patent No.: US 12,081,541 B2
(45) Date of Patent: Sep. 3, 2024

(54) DEVICE-SIDE FEDERATED MACHINE LEARNING COMPUTER SYSTEM ARCHITECTURE

(71) Applicant: PayPal, Inc., San Jose, CA (US)

(72) Inventors: Abhishek Chhibber, Sunnyvale, CA (US); Darshankumar Bhadrasinh Desai, Fremont, CA (US); Michael Charles Todasco, Santa Clara, CA (US); Vidyut Mukund Naware, Fremont, CA (US); Nitin S. Sharma, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 498 days.

(21) Appl. No.: 17/395,204

(22) Filed: Aug. 5, 2021

(65) Prior Publication Data

US 2023/0040721 A1 Feb. 9, 2023

(51) Int. Cl.
*H04L 29/06* (2006.01)
*G06N 20/20* (2019.01)
*H04L 9/40* (2022.01)

(52) U.S. Cl.
CPC ......... *H04L 63/0861* (2013.01); *G06N 20/20* (2019.01); *H04L 63/0876* (2013.01)

(58) Field of Classification Search
None
See application file for complete search history.

(56) References Cited

U.S. PATENT DOCUMENTS

| 8,589,398 | B2 | 11/2013 | Sundaresan et al. |
| 9,275,340 | B2 | 3/2016 | Patil et al. |
| 10,616,369 | B1 | 4/2020 | D'Andrea et al. |
| 10,834,084 | B2 * | 11/2020 | Ouellette ............ H04L 63/107 |
| 11,552,953 | B1 * | 1/2023 | Avadhanam .......... H04L 63/102 |
| 2015/0186383 | A1 | 7/2015 | Pinckney et al. |

(Continued)

FOREIGN PATENT DOCUMENTS

| CN | 111369342 | * | 7/2020 |
| CN | 112232528 | B | 3/2021 |
| WO | 2021123139 | A1 | 6/2021 |

OTHER PUBLICATIONS

Bonneau et al., "The Quest to Replace Passwords: A Framework for Comparative Evaluation of Web Authentication", IDOI: 10.1109/SP.2012.44 (Year: 2012).*

(Continued)

*Primary Examiner* — Piotr Poltorak

(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed in which a computer system receives a transaction request and uses a federated machine learning model to analyze the transaction request. A server computer system may generate a federated machine learning model and distribute portions of the federated machine learning models to other components of the computer system including a user device and/or edge servers. In various embodiments, various components of the computer system apply transaction request evaluation factors to the portions of the federated machine learning model to generate scores. The server computer system uses the scores to determine a response to the transaction request.

20 Claims, 15 Drawing Sheets

(56) References Cited

U.S. PATENT DOCUMENTS

| | | |
|---|---|---|
| 2018/0191867 A1 | 7/2018 | Siebel et al. |
| 2018/0225467 A1* | 8/2018 | Hsiang .................. H04L 9/0866 |
| 2019/0042637 A1 | 2/2019 | Ullrich et al. |
| 2019/0042937 A1 | 2/2019 | Sheller et al. |
| 2020/0153821 A1* | 5/2020 | Cao ..................... H04L 63/0861 |
| 2020/0293638 A1* | 9/2020 | Rose .................. H04L 63/1425 |
| 2020/0293887 A1 | 9/2020 | De Brouwer et al. |
| 2021/0064591 A1 | 3/2021 | Sun et al. |
| 2021/0073677 A1 | 3/2021 | Peterson et al. |
| 2021/0099454 A1* | 4/2021 | Rahimi ................ H04L 63/102 |
| 2021/0150269 A1 | 5/2021 | Choudhury et al. |
| 2021/0174257 A1 | 6/2021 | Pothula et al. |
| 2021/0319527 A1* | 10/2021 | Benkreira ............. H04W 12/66 |
| 2023/0041015 A1* | 2/2023 | Chhibber ............... G06N 20/00 |

OTHER PUBLICATIONS

Mothukuri et al., "A survey on security and privacy of federated learning", Elsevier, Future Generation Computer Systems, vol. 115, Feb. 2021, pp. 619-640 (Year: 2021).*
International Preliminary Report on Patentability for Application No. PCT/US2022/074037 mailed on Feb. 15, 2024, 10 pages.
International Search Report and Written Opinion for Application No. PCT/US2022/074037 mailed on Oct. 26, 2022, 11 pages.
Wahab O.A., et al., "Federated Machine Learning: Survey, Multi-Level Classification, Desirable Criteria and Future Directions in Communication and Networking Systems," IEEE Communications Surveys & Tutorials, vol. 23, No. 02, Second Quarter 2021, retrieved on Sep. 20, 2022, Retrieved from Internet URL: https://ieeexplore.ieee.org/document/9352033, 56 pages.

* cited by examiner

DEVICE-SIDE FEDERATED MACHINE LEARNING COMPUTER SYSTEM ARCHITECTURE

CROSS-REFERENCE TO RELATED APPLICATION

The present application shares a specification with U.S. patent application Ser. No. 17/395,014 entitled "Federated Machine Learning Computer System Architecture" filed on Aug. 5, 2021.

BACKGROUND

Technical Field

This disclosure relates generally to security in computer systems, and in particular the use of a federated machine learning model to determine a response to transaction requests.

Description of the Related Art

Computer systems that are available to access from unsecured networks such as the Internet use various techniques to determine whether requests made to the computer systems are authentic and approved. In various systems, authentication information such as usernames and passwords are used. To increase security, computer systems may also use machine learning algorithms that are able to identify patterns that are associated with legitimate requests and/or with malicious requests. Some of such machine learning algorithms use sensitive information that may be usable to personally identify individual users.

Figure 1:
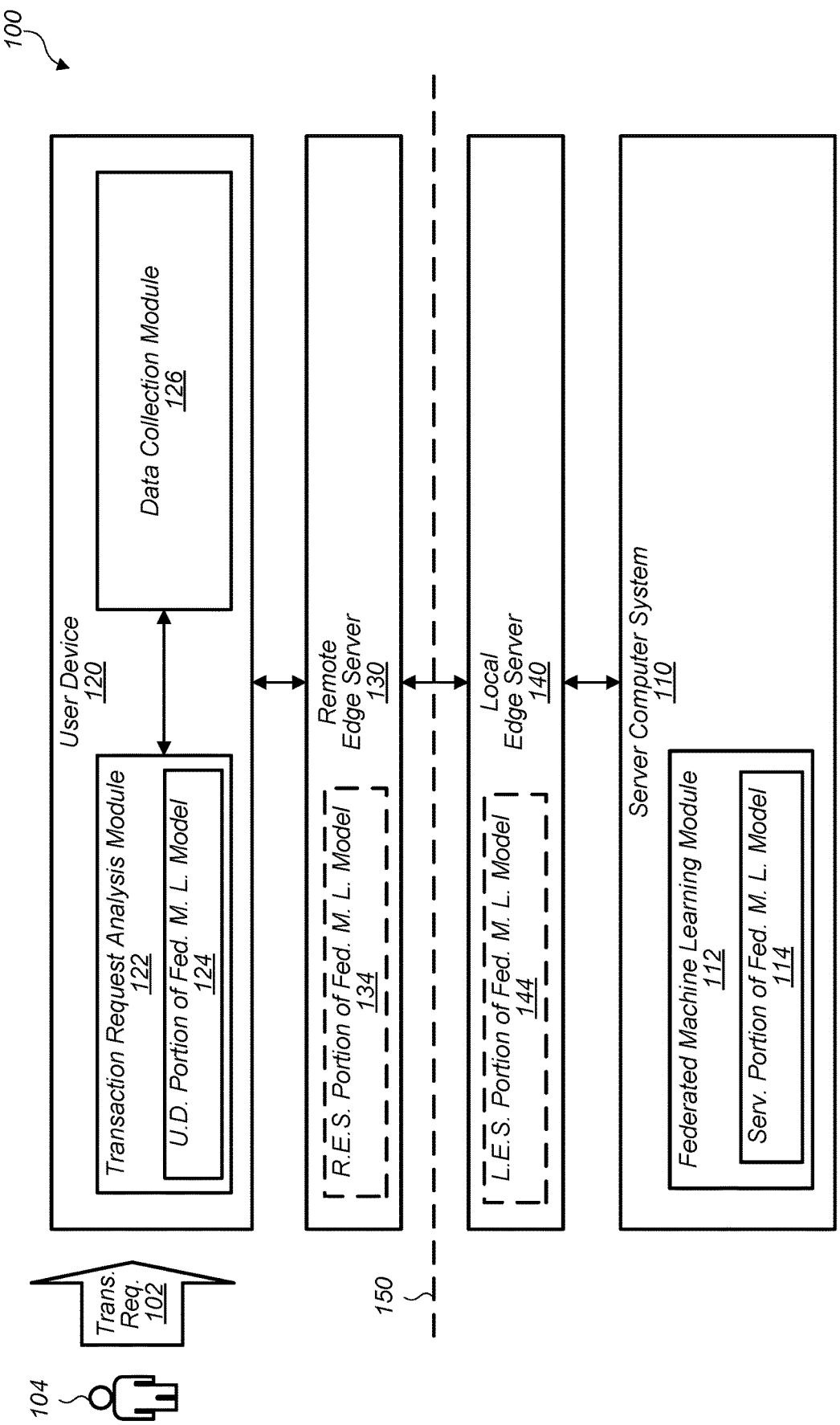
FIG. 1 is a block diagram illustrating an embodiment of a computer system configured to implement a federated machine learning model.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to collect user behavior information" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" subsets of transaction request evaluation factors would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

"In this disclosure, various "modules" operable to perform designated functions are shown in the figures and described in detail (e.g., federated machine learning module 112, transaction request analysis module 122, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa."

DETAILED DESCRIPTION

When a user accesses a computer service to request transactions such as logins, purchases or other financial transactions, or access to secured data or resources, it is important to verify the identity of the user to protect secured resources. In the past, simple methods such as usernames and passwords were used to verify identity, but such simple, one-factor verification techniques are vulnerable to attack and increasingly insufficient to satisfy data protection laws and regulations. Increasingly, multi-factor authentication methods are being used authenticate user accesses to increase computer security. Moreover, multi-factor authentication is increasingly being required by regulators such as the European Union ("EU") with the Strong Customer Authentication ("SC") requirement that was introduced in 2019.

Generally speaking, authentication may be performed using authentication factors that are typically divided into three categories: knowledge, possession, and inherence. Knowledge factors include factors that are related to demonstrating that a user seeking authentication knows one or more pieces of information (e.g., a username, a password) that are compared to information stored at the authenticating computer system (e.g., comparing a hash of a password entered by a user with a hash of the password sorted at the authenticating computer system). Possession factors include factors that are related to demonstrating that a user seeking authentication has possession of an article or device that is known to be associated with the user (e.g., a physical token or program that generates predictable pseudorandom numbers, a device having the same network address of previous accesses, a device that is operable to receive an out-of-band communication such as a text message or email message). Inherence factors include factors that are related to demonstrating that a user seeking authentication is the same individual as the user who owns the account (e.g., biometric information, user behavior information).

While some information used to satisfy authentication factors may be of a less sensitive nature, other information (especially information that relates to inherence or possession) may be personally identifiable information or other sensitive information that users may desire not to be shared with the authenticating computer system. Additionally, makers of user devices have begun notifying users when usage information is being collected and providing users with configuration options that limit information collection. Moreover, recent government regulation such as the EU's General Data Protection Regulation ("EU GDPR") impose significant requirements on how such sensitive information is obtained and stored with significant penalties for non-compliance. Further, in some instances collecting some information to use to demonstrate possession or inherence may be cumbersome for logistical reasons. For example, if a large enterprise requires multi-factor authentication to authenticate accesses by its employees to a secured computer service, some information like users' personal cellular telephone number may be difficult to obtain and keep up-to-date such that some traditional multi-factor authentication techniques may be difficult to implement. Storing such personal information may also be regulated by EU GDPR and similar regulations. Accordingly, multi-factor authentication is increasingly preferred (or required), but the collection and usage of sensitive information is also increasingly fraught.

Additionally, in various contexts sensitive information and machine learning may also be usable to determine whether a requested transaction is authorized. For example, an enterprise employing hundreds of users may desire to monitor trends in user behavior to proactively identify deviations, which may be useable to identity a compromised computer system and prevent improper transactions from being allowed. Here too the collection and usage of sensitive information is also increasingly fraught.

As the computing power of user devices and edge devices increases, such devices are increasingly becoming capable of applying computationally intensive machine learning models to evaluate transaction requests. In order to provide for secure, multi-factor authentication while minimizing (or eliminating entirely) the transmission of sensitive information to the authenticating computer system, techniques are proposed below to implement a "federated machine learning model." In a federated machine learning model, various computer systems including a user device and and/or one or more edge servers are configured to apply information collected about a requested transaction to local portions of federated machine learning model that have been distributed across the computer system. As used herein, "distributing" a federated machine learning model refers to sending portions of the federated machine learning model from a centralized server computer system to other computer systems. These distributed portions are usable to generate scores by applying input to the portion of the federated machine learning model. The generated scores may be used to make decisions (such as determining whether to grant a request).

Thus, scores that are useable to satisfactorily demonstrate multi-factor authentication or authorization may be generated using sensitive information, and these scores can be communicated instead of the sensitive information itself.

For example, user behavior information such as how a user holds their user device and where the user uses the device may be collected along with biometric information about the user themselves and evaluated with a portion of the federated machine learning model implemented on the user device. The portion of the federated machine learning model implemented on the user device is operable to generate scores that are sent to the authenticating computer system instead of the sensitive information itself. Additionally, sensitive information may be sent to an edge server that is operable to apply a portion of the federated machine learning model instead of the authenticating computer system (which may be owned by a different entity and/or on the other side of a less secure wide area network), which also reduces distribution of sensitive information and the risks inherent in distribution of sensitive information.

Thus, in various embodiments, sensitive device data, user behavior data, user information, and/or network data would not leave the confines of a local network. Instead, portions of machine learning models would be downloaded to user devices and/or to edge servers. The scores generated by these portions scores could then be sent to the authenticating computer system and married with machine learning models running on the authenticating computer system to determine how to respond to a transaction request. This kind of hybrid machine learning implementation not only helps increase the security of the computer system using machine learning models but also reduces risk around privacy and sensitive information. As little to no sensitive information is taken off of user devices or outside a local network, these techniques are less likely to run afoul of user privacy concerns or regulations.

Computer System Architecture

Overview of Computer System Architecture

FIG. 1 is a block diagram illustrating an embodiment of a computer system 100 that includes a server computer system 110, a user device 120, a remote edge server 130, and a local edge server 140 that are configured to implement a federate machine learning model to evaluate transactions requests made by a user using user device 120. In various embodiments, the various components of computer system 100 communicate with each other via a combination of local and wide area networks. In various embodiments, for example, user device 120 communicates with remote edge server 130 using a local broadband cellular network or WiFi network, remote edge server 130 communicates with local edge server 140 over a wide area network (e.g., the Internet), and local edge server 140 communicates with server computer system 110 via a local wired network. In FIG. 1 (and in other figures), a line indicating a network boundary 150 separates components of computer system 100 that are on either side of a wide area network. For consistency, herein the term "local" refers to devices that are local to the server computer system 110 (i.e., on the same side of a wide area network connection) and the term "remote" refers to devices that are remote from the server computer system 110 (i.e., on the other side of a wide area network connection). In various embodiments, no separate local edge server 140 is present and a server computer system 110 performs the functions of local edge server 140 to communicate with remote edge server 130 over a wide area network connection. While only one of each of server computer system 110, user device 120, remote edge server 130, and local edge server 140 are shown in FIG. 1, it will be understood that any number of each may be present. For example, computer system 100 may include thousands or millions of user devices 120, hundreds of remote edge servers 130, and dozens of local edge servers 140 and server computer systems 110.

In various embodiments, server computer system 110 is a computer system that is operable to interact with user device 120 and other components of computer system 100 evaluate and facilitate transaction requests. In various embodiments, server computer system 110 is implemented by using software running on a single a computer system (e.g., a desktop computer, a laptop computer, a tablet computer, a mobile phone, a server) or a plurality of computer systems (e.g., a network of servers operating as a cloud). In other embodiments, computer system 110 is implemented in specialized hardware (e.g., on an FPGA) or in a combination of hardware and software.

Server computer system 110 includes a federated machine learning module 112 that is operable to generate a federated machine learning model (e.g., federated machine learning model 400 shown in FIG. 4) which includes the various portions 114, 124, 134, and 144 shown in FIG. 1, to distribute the portions 124, 134, and 144 to other components of computer system 100, and to apply server portion of federated machine learning model to determine how to respond to transaction request 102. As discussed herein, the various portions 114, 124, 134, and 144 are operable to take as input various sets of transaction request evaluation factors and to output scores generated by applying the transaction request evaluation factors to the various portions 114, 124, 134, and 144 of the federated machine learning model. As discussed herein, some transaction request evaluation factors may be of a sensitive nature with privacy implications (e.g., personally identifiable information) while other are less sensitive (e.g., time and date information, operating system type and version of user device 120), As discussed herein, the various portions 114, 124, 134, and 144 are usable to determine whether to grant transaction requests 102 without sensitive information being sent to server computer system 110 in various embodiments.

Additionally, server computer system 110 implements its own server portion 114 of the federated machine learning model, which allows server computer system 110 to have a final say on whether to grant a transaction request 102, adjust the machine learning model based on changing conditions across computer system 100, apply different evaluation rules across different subsets of user devices 120 (e.g., across different regions, across different types of user devices 120, etc.). In various embodiments, server computer system 110 is operable to perform other functions in addition to facilitating the use of a federated machine learning model to evaluate transaction requests 102 from users 104 (e.g., providing a website, providing a computer-implemented financial transaction service, etc.). Server computer system 110 is discussed in further detail in reference to FIG. 4. The federated machine learning model and its various portions are discussed in further detail in reference to FIGS. 2, 3, 4, 5A, and 5B.

User device 120 is a computer system that is operable to facilitate interactions between users 104 and server computer system 110. In various embodiments, user device 120 can be implemented as one of (but not limited to) a desktop computer, a laptop computer, a tablet computer, a mobile phone, and/or a wearable computer. In various embodiments, user device 120 can be implemented by software running on a computer system (e.g., a server) or a plurality of computer systems (e.g., a network of servers operating as a cloud). In other embodiments, user device 120 is implemented in specialized hardware (e.g., on an FPGA) or in a combination of hardware and software. User device 120 is operable to create a transaction request 102 in response to accessing user input, such as received at the user device 102, and send this transaction request to the server computer system 110. Computer system 100 is operable to evaluate such a transaction request 102 using a federated machine learning model that is implemented on various portions of computer system 100. As discussed herein, transaction request 102 may be a request to access any of a number of secured electronic resources including but not limited to (a) a request to log in to a secure computer service or website, (b) a request to purchase goods or services, (c) a financial transaction involving moving funds from one account to another, or (d) a request to access a secured data or media file.

User device 120 includes a transaction request analysis module 122 that is operable to apply a user device portion 124 of the federated machine learning model (referred to herein as a user device portion 124 or a remote device portion of the federated machine learning model) to information that is related to transaction request 102. In various embodiments, user device 120 does not include a transaction request analysis module 122 and instead sends collected information to remote edge server 130 or other computer systems for analysis as discussed herein.

User device 120 includes a data collection module 126 that is operable to collect information about user device 120, about how a user has used user device 120, and/or about user 104. In various embodiments discussed in additional detail herein, through the use of transaction request analysis module 122 and the user device portion 124 of the federated machine learning model, user device 120 is operable to evaluate transaction request evaluation factors that may include sensitive information (e.g., personally identifiable information, health information, etc.) to determine whether a transaction request should be granted. In various embodiments, such a determination is made without sending sensitive information to server computer system 110. In some embodiments, such sensitive information is evaluated using transaction request analysis module 122 and is not sent to another computer (i.e., such information does not leave user device 120). In other embodiments, some of such sensitive information may be sent to remote edge server 130 for analysis using a remote edge server portion 134 of the federated machine learning model that is applied by remote edge server 130. In such embodiments, at least some of the sensitive information sent to remote edge server 130 is not sent over network boundary 150. User device 120 is discussed in additional detail in reference to FIG. 2.

In various embodiments, remote edge server 130 and local edge server 140 are computer systems that are situated on either side of network boundary 150. In various embodiments, remote edge server 130 and local edge server 140 are implemented using computer systems (e.g., servers, groups of servers operating together as a cloud). In various embodiments, remote edge server 130 and local edge server 140 are edge computing systems that facilitate networking with computer systems on their side of network boundary 150 and communication across network boundary 150. For example, in various embodiments remote edge server 130 and local edge server 140 are 5G (or subsequent generation) edge servers that are operable to perform advanced computing functions beyond simply facilitating communication across network boundary 150. In various embodiments, remote edge server 130 is operable to accept distributed processing requests from user device 120 (e.g., requests from user device 120 to perform calculations or other processing). Similarly, local edge server 140 is operable to accept distributed processing requests from server computer system 110. In various embodiments, remote edge server 130 and local edge server 140 are operable to apply respective portions 134, 144 of the federated machine learning model, which are indicated in dashed lines to indicate that such portions 134, 144 of the federated machine learning model are not present in all embodiments). Remote edge server 130 and local edge server 140 are discussed in further detail in reference to FIG. 3.

Accordingly, by distributing portions of a federated learning model to various component of computer system 100, computer system 100 is operable to collect transaction request evaluation factors such as information about user device 120, user behavior of user 104, and information about user 104 (some or all of which may include sensitive information), and apply such transaction request evaluation factors to a federated machine learning model to evaluate a transaction request 102. Such analysis may be performed without sending sensitive information off of user device 120 and/or without sending sensitive information across network boundary 150. Additionally, even if sensitive information is sent across network boundary 150, the sensitive information may be processed at local edge server 140 and not stored at server computer system 110. Further, because server computer system 110 applies a server portion 114 of the federated machine learning model (which in various embodiments includes the decision threshold(s) used to determine whether to grant the transaction request), server computer system 110 has not completely outsourced the decision making to other components of computer system 100. Accordingly, a federated machine learning model can be applied to evaluating a transaction request 102, enabling analysis of transaction request evaluation factors which are sensitive information while reducing risks relating to data privacy for such sensitive information.

Figure 2:
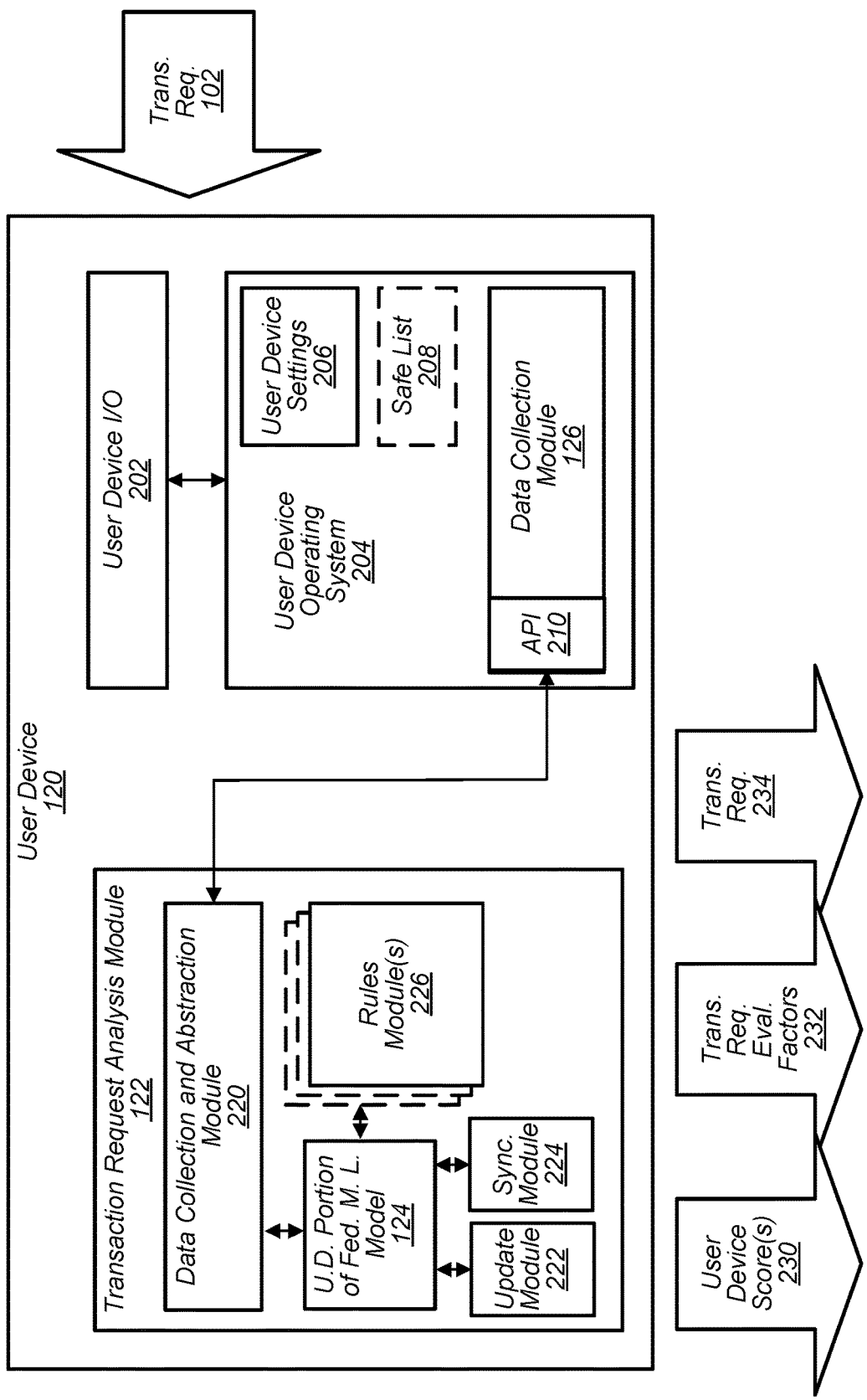
FIG. 2 is an expanded block diagram of the user device of FIG. 1 in accordance with various embodiments.

User Device, Transaction Requests, and Transaction Request Evaluation Factors Collected by the User Device FIG. 2 is an expanded block diagram illustrating user device 120 (and components thereof) in additional detail. In the embodiments illustrated in FIG. 2, user device 120 includes transaction request analysis module 122, user device portion 124 of the federated machine learning model, and data collection module 126 discussed in reference to FIG. 1 as well as additional components. In particular, FIG. 2 illustrates additional detail about transaction request analysis module 122 which may be installed on user device 120 (e.g., by server computer system 110) as part of adding user device 120 to computer system 100 as well as various built-in components of user device 120 such as user device input/output ("I/O") 202 and user device operating system ("OS") 204. In addition to the components shown in FIG. 2, various other applications may be installed on user device 120 such a web browser, a financial application (e.g., an application operated by a financial institution with which user 104 is associated), a media player, a file synchronization and storage application, a shopping application, etc.

User device I/O 202 includes any of a number of I/O devices (and firmware and software for the same) that is usable to receive input from and provide output to user 104 or other components of computer system 100. User device I/O 202 includes but is not limited to one or more displays (e.g., touchscreen displays), keyboards or other buttons, pointing devices, cameras, biometric sensors (e.g., fingerprint scanners, retinal scanners), gyroscopes or other motion sensing devices, location sensors (e.g., GPS interfaces), communication devices (e.g., Bluetooth, NFC, cellular, WiFi, wired communication). In various embodiments, it will be understood that the type of transaction request evaluation factors that may be collected and evaluated will vary according to the I/O capabilities of user device 120 (e.g., GPS coordinates can be collected if user device 120 includes a GPS sensor, fingerprint information cannot be collected if user device 120 does not include a fingerprint scanner). Further, various types of user device I/O 202 may collect information that is only of a sensitive nature (e.g., a fingerprint scanner), information that may be sensitive or may be less sensitive (e.g., a camera that is useable to capture images of the face of user 104 as well as a pattern on a wall behind user 104), or information that is generally less sensitive (e.g., the time of day that user device 120 is being used, the time of day that user device 120 is idle). As discussed herein, what information is collected using user device I/O 202 and made available to transaction request analysis module 122 may be controlled by user device OS 204 and/or configurations to user device 120 (e.g., user device settings 206).

Collecting Transaction Request Evaluation Factors

In some embodiments, user device 120 is operable to collect (and to analyze using transaction request analysis module 122) user behavior information. As used herein "user behavior information" refers to any information about how one or more users 104 has used a particular user device 120. In various embodiments, user behavior information includes but is not limited to: location information (e.g., a geolocation of user device 120), temporal information (e.g., when user device 120 is used, when user device 120 is idle), accelerometer information and gyroscopic information (e.g., how user 104 holds and moves user device 120), input patterns (e.g., typing speed, cursor movements), what peripheral devices are connected to user device 120 (e.g., whether wireless headphones or fitness trackers are connected with user device 120), etc. In some embodiments, user behavior information may also include information about the environment in which user device 120 is used such as temperature, humidity, and pressure sensors. It will be understood that some subsets of user behavior information may be more sensitive than others (e.g., location information may be more sensitive than gyroscope information). Moreover, a user device 120 may include explicit settings marking some or all of such user behavior information as sensitive (e.g., user 104 has configured user device 120 not share gyroscope information with other computer systems).

In some embodiments, user device 120 is operable to collect (and to analyze using transaction request analysis module 122) user device information. As used herein "user device information" refers to any information about user device 120 itself. In various embodiments, user device information includes but is not limited to: networking information (e.g., IP addresses, MAC addresses, network paths, whether user devices 120 is connected to WiFi networks or cellular networks), information about hardware of user device 120 (e.g., serial numbers, processor model numbers, connected peripherals), information about software of user device 120 (e.g., version and type of user device OS 204, a user agent of a web browser), and device fingerprinting (e.g., hardware differences in user device 120 as a result of manufacturing variation that are unique to the user device 120 and may be measured using various algorithms). As with user behavior information, it will be understood that some subsets of user device information may be more sensitive than others (e.g., networking information may be more sensitive than user agent information). Moreover, a user device 120 may include explicit settings marking some or all of such user device information as sensitive (e.g., user 104 has configured user device 120 not share a list of WiFi networks detected by user device 120 with other computer systems).

In some embodiments, user device 120 is operable to collect (and to analyze using transaction request analysis module 122) user information. As used herein, "user information" refers to information about user 104. In various embodiments, user information includes but is not limited to: biometric information (e.g., fingerprints, retinal scans), facial scans or other visual information about user 104, voice patterns, health or fitness information (e.g., heartbeat, number of steps in a period of time), etc. As with user behavior information and user device information, it will be understood that some subsets of user information may be more sensitive than others. Moreover, a user device 120 may include explicit settings marking some or all of such user information as sensitive (e.g., user 104 has configured user device 120 not share fingerprint information with other computer systems).

Collectively, user behavior information, user device information, and user information may be referred to as "transaction request evaluation factors." The term "transaction request evaluation factors" may also include information that was not collected by user device 120, however, such as information collected by server computer system 110 discussed below. Such "transaction request evaluation factors" are usable by computer system 100 using a federated learning model to determine how to respond to transaction request 102. In various instances, some or all transaction request evaluation factors may be sensitive information (including information that usable to personally identify user 104). As discussed herein, in various embodiments some or all of the transaction request evaluation factors collected by user device 120 are not sent off of user device 120 at all. In other embodiments, some or all transaction request evaluation factors collected by user device 120 are sent to remote edge server 130 as transaction request evaluation factors 232 to be analyzed using a remote edge server portion 134 of the federated machine learning model. In some embodiments, some transaction request evaluation factors collected by user device 120 are sent to server computer system 110 (and/or local edge server 140) as transaction request evaluation factors 232. In various embodiments, transaction request evaluation factors that include sensitive information are not sent across network boundary 150 and are applied by user device 120 and/or remote edge server 130 to user device portion 124 and/or remote edge server portion 134 to generate scores as discussed herein. As discussed below in further detail in reference to FIG. 4, other transaction request evaluation factors (e.g., transaction request information about other transaction requests from other user devices) that are not collected by user device 120 may also be used to evaluate transaction request 102.

In addition to collecting information that may be used to evaluate transaction request 102, user device I/O 202 is also operable to collect transaction information. As used herein, "transaction information" refers to information about a transaction requested by transaction request 102. Such transaction information describes the requested transaction: what is requested, by whom, etc. Such transaction information may vary according to the kind of transaction being requested. If the transaction request 102 is a login request, for example, such transaction information may include but is not limited to a username and password entered by user 104. If transaction request 102 is a purchase request, then transaction information may include but is not limited to where the purchase request was input (e.g., a URL of a website running on a browser, an application used to submit the purchase quest), an identifier of the user account requesting the purchase, an identifier of the merchant, an identifier of a payment method for the purchase, an identifier of a billing address and/or shipping address, an amount of the purchase, etc. If transaction request 102 is a financial request such as a request to transfer funds between bank accounts, transaction information may include but is not limited to an indication of the source account, an indication of the destination account, a username of the requestor, etc. Additionally, the transaction request 102 is a request to access a secured resource (e.g., one or more files), transaction information may include but is not limited to a file pathway of the secured resource, a username of the requestor, etc.

User device OS 204 may be any of a number of operating systems installed on user device 120 that is operable to control the functions of user device 120. In various embodiments, user device OS 204 controls user device I/O 202 and determines what information to collect, whether and how it is stored, and whether such information is made available to transaction request analysis module 122. In various embodiments, such information collection is managed by data collection module 126, which includes an application program interface (API) 210 that is operable to send collected information to a data collection and abstraction module 220 of transaction request analysis module 122 (e.g., regularly, upon request). Thus, information may be collected by data collection module 126 of user device OS 204 and made available, via API 210, to then be collected (and in embodiments, abstracted or anonymized) by third-party applications such as data collection and abstraction module 220 of transaction request analysis module 122. As recited herein, recitations of "collecting" refer to collecting information in the first instance using user device I/O 202 as well as collecting such information by transaction request analysis module 122 receiving such information from another component of user device 120.

In various embodiments, user device OS 204 include one or more user device settings 206 which may be set by a manufacturer of user device 120, user 104, or another entity associated with user device 120 (e.g., an internet service provider, an employer of user 104). In various embodiments, user device settings 206 are settable to control what information is collected, whether such information is stored, and whether such information is shared with third-party applications such as transaction request analysis module 122. For example, a first user device setting 206 may dictate that location information may not be shared with third-party applications. Another user device setting 206 may disable a WiFi module of user device 120, thus preventing monitoring of nearby WiFi SSIDs. As a third example, a thumbprint sensor may be enabled in a user device setting 206, allowing for collection of thumbprint information. In short, user device settings 206 generally limit what data is collected and how it is used. In various instances, user 104 may have very granular control via such user device settings 206, thus allowing for fine tuning of what data is collected and shared. In some instances, user device settings 206 may explicitly prevent any personally identifiable information from leaving user device 120 such that personally identifiable information is never shared with other components of computer system 100.

In some embodiments, user device OS 204 includes an optional safe list 208 (indicated in dashed lines). In various embodiments, user device OS 204 may generally require authorization (e.g., from user 104) to collect sensitive information and/or share such sensitive information with third-party applications such as transaction request analysis module 122. As an example, user device OS 204 may notify a user that a third-party application is requesting location data and ask for the user to sign off on such requests. Such request and sign-off workflows, however, can impede ease of use by user 104. In some instances, therefore, user device OS 204 may maintain a safe list 208 of third-party applications that are allowed to access some or all of the sensitive information collected by user device 120 without explicit user permission. In some embodiments, membership on the safe list 208 may be conditioned on meeting certain criteria with respect to sensitive information. For example, membership on safe list 208 may be conditioned on the third-party application anonymizing data and/or masking personally identifiable information (e.g., by removing names, by abstracting more specific information like full IP address to less specific information like an IP address range). In some embodiments, member on the safe list 208 may be conditioned on proving that the third-party application sends no personally identifiable information off of user device 120 (e.g., all analysis on personally identifiable information is performed on user device 120 or information is transformed such that it is no longer personally identifiable before being sent off of user device 120). In some embodiments, membership on the safe list 208 is controlled by an outside body such as a governmental regulatory agency or non-governmental standards-setting body.

Analyzing Transaction Request Evaluation Factors Using a User Device Portion of a Federated Machine Learning Model Transaction request analysis module 122 (also referred to herein as authentication software) is a third-party application that is installed on user device 120 (e.g., an application installed on user device 120 by server computer system 110 to facilitate transactions using computer system 100) which is operable to authenticate transaction requests 102 using the federated machine learning model techniques discussed herein. As discussed above, transaction request analysis module 122 includes a user device portion 124 of the federated machine learning model that was received from server computer system 110 prior to user device 120 receiving transaction request 102. As discussed in additional detail in reference to FIG. 4, user device portion 124 of the federated machine learning model was generated by a server computer system 110 using a dataset of previous transaction requests. In various embodiments, federated machine learning model includes a server portion 114 and one or more remote device portions including user device portion 124 and optionally a remote edge server portion 134 and/or a local edge server portion 144.

Transaction request analysis module 122 includes a data collection and abstraction module 220 that is operable to receive transaction request evaluation factors collected by user device 120 (e.g., via API 210). In various embodiments, data collection and abstraction module 220 is operable to anonymize and/or abstract information received by data collection and abstraction module 220. In some embodiments, information received by data collection and abstraction module 220 is personally identifiable information usable to identify user 104, and in some embodiments anonymizing and/or abstracting such information makes it no longer personally identifiable information. In various embodiments, data collection and abstraction module 220 is operable to convert collected information into a different format to enable the collected information to be applied to user device portion 124 of the federated machine learning model.

Transaction request analysis module 122 is operable to generate one or more user device scores 230 by applying collected transaction request evaluation factors to the user device portion 124 of the federated machine learning model. In various embodiments, user device portion 124 of the federated machine learning model takes as input various transaction request evaluation factors. In some embodiments, user device portion 124 of the federated machine learning model takes as input user behavior information, user device information, and user information, but in other embodiments user device portion 124 of the federated machine learning model may take fewer inputs and sent collected transaction request evaluation factors to other portions of computer system as transaction request evaluation factors 232.

In various embodiments, federated machine learning model (and user device portion 124 of the federated machine learning model) is trained to identify deviations from more typical transaction requests. As discussed in further detail in reference to FIGS. 5B, 6D, and 7, in various embodiments, user device portion 124 of the federated machine learning model is trained using data collected by user device 120. If transaction request evaluation factors differ markedly from the norm, such a deviation may be detected upon applying the transaction request evaluation factors to user device portion 124 of the federated machine learning model. For example, if prior user behavior factors indicate that user 104 typically hold user device 120 in their left hand (as shown by gyroscope information), uses user device 120 from 10:00 to 20:00 GMT, and types slowly, if user behavior information collected around the time a particular transaction request 102 is received indicates user device 120 is being held in a right hand, being used at 02:00 GMT, and with increased typing speed, these deviations may result in a change to the user device scores 230.

In various embodiments, user device scores 230 are generated on a regular basis and not in response to receiving transaction request 102. In such embodiments, user device scores 230 may include a "trust score" that is indicative of a degree to which federated machine leaning model has determined that the current usage pattern and device information has not materially deviated from prior patterns. Accordingly, such a trust score does not represent an indication of whether a transaction request 102 itself is fraudulent, but rather represents a wholistic evaluation of the circumstances surrounding the submission of transaction request 102 and whether present circumstances are different from the circumstances surrounding the submission of previous transaction requests.

In other embodiments, federated machine learning model (and user device portion 124 of the federated machine learning model) is trained to detect whether a particular transaction request 102 represents a deviation from an ideal (e.g., defined by computer security analysts). In such embodiments, federated machine learning model (and user device portion 124 of the federated machine learning model) are operable to determine whether a particular transaction request 102 is "correct" or "incorrect" based on comparing it to the ideal. The generation of user device scores 230 by applying transaction request evaluation factors to user device portion 124 of the federated machine learning model is discussed in additional detail in reference to FIG. 5A.

Transaction request evaluation factors 232 may be sent to any combination of remote edge server 130, local edge server 140, and server computer system 110 depending what kind of transaction request evaluation factors 232 are being sent (e.g., less sensitive transaction request evaluation factors may be sent to server computer system 110 whereas sensitive transaction request evaluation factors are only sent to remote edge server 130). As discussed herein, in some embodiments, no transaction request evaluation factors 232 are sent from user device 120 to any other portion of computer system 100. In some embodiments, transaction request evaluation factors used to generate users scores 230 are not sent off of user device 120. For example, biometric information (even abstracted biometric information) that is applied to user device portion 124 to generate user device scores 230 pertaining to biometric matches may not be sent to any other computer systems; rather the user device scores 230 are sent instead (in some of such embodiments transaction request evaluation factors 232 that were not used to generate user devices scores 230 may be sent out as well). In other embodiments, however, transaction request evaluation factors may be used to generate user device scores 230 and also sent to other components of computer system 100 for additional analysis (e.g., as a second opinion and/or to be aggregated with transaction request evaluation factors collected by other user devices 120 and processed by remote edge server 130). In addition to sending user device score(s) 230 and (optionally) transaction request evaluation factors 232, transaction request analysis module 122 is operable to send an indication of transaction request 234. In various embodiments, the indication of transaction request 234 includes the transaction information input by user 104 as part of inputting transaction request 102 as well as information about how, when, where transaction request 102 was entered (e.g., via a web browser, when transaction request 102 was received by user device 120, etc.).

In various embodiments, transaction request analysis module 122 includes one or more rules modules 226. In various embodiments, rules modules 226 are operable to make various decisions based on user device scores 230 (e.g., whether to deny a transaction request because the user device score 230 for a particular transaction request differs from the established trend by more than a standard deviation). In some of such embodiments, rules modules 226 may be operable to make a limited set of decision without communicating with server computer system 110. In some embodiments, such rules may simply deny transaction requests 102 that represent obvious deviations or to ask for additional information from user 104 prior to communicating with server computer system 110. In some embodiments, rules modules 226 may operate behind scenes from the perspective of user 104. In such embodiments, rather than asking user 104 for additional information, rules modules 226 may cause data collection and abstraction module 220 to collect additional information for analysis. For example, such a second collection may collect a larger set of information that is useable to generate additional user device scores 230 or to send to other components of computer system 100. As a non-limiting example, if user device information collected around the time a particular transaction request 102 is received indicates a dramatic change in the number and SSIDs of WiFi networks detected by user device 120, such information may be sent to remote edge server 130 where such device information may be combined with WiFi network information from other user devices 120 and applied to a remote edge server portion 134 of the federated machine learning model implemented by remote edge server 130.

Figure 5A:
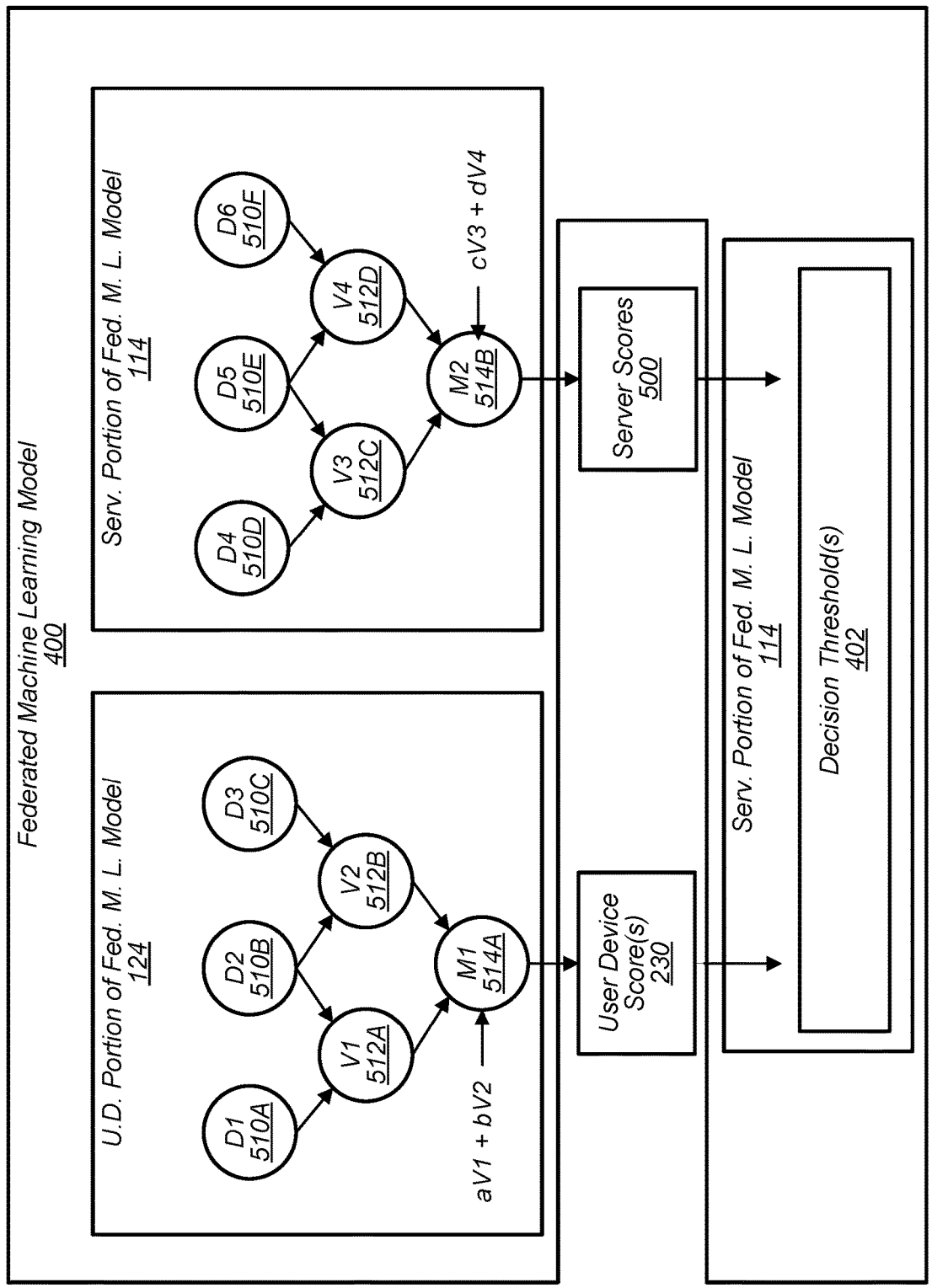
FIG. 5A is block diagram of an example of the federated machine learning model of FIG. 1 in accordance with various embodiments.

In various embodiments, transaction request analysis module 122 includes modules that are operable to modify user device portion 124 of the federated machine learning model: an update module 222 that is operable to adjust user device portion 124 of the federated machine learning model as transaction request evaluation factors are received and analyzed (e.g., by changing weights applied to various aspects of user device portion 124 of the federated machine learning model as discussed in further detail in reference to FIG. 5A) and a synchronization module 224 that is operable to adjust user device portion 124 of the federated machine learning model based on updated provided by other portions of computer system 100 including server computer system 110. In various embodiments, synchronization module 224 is operable to send an indication of the user device portion 124 as adjusted by update module 222.

Figure 5B:
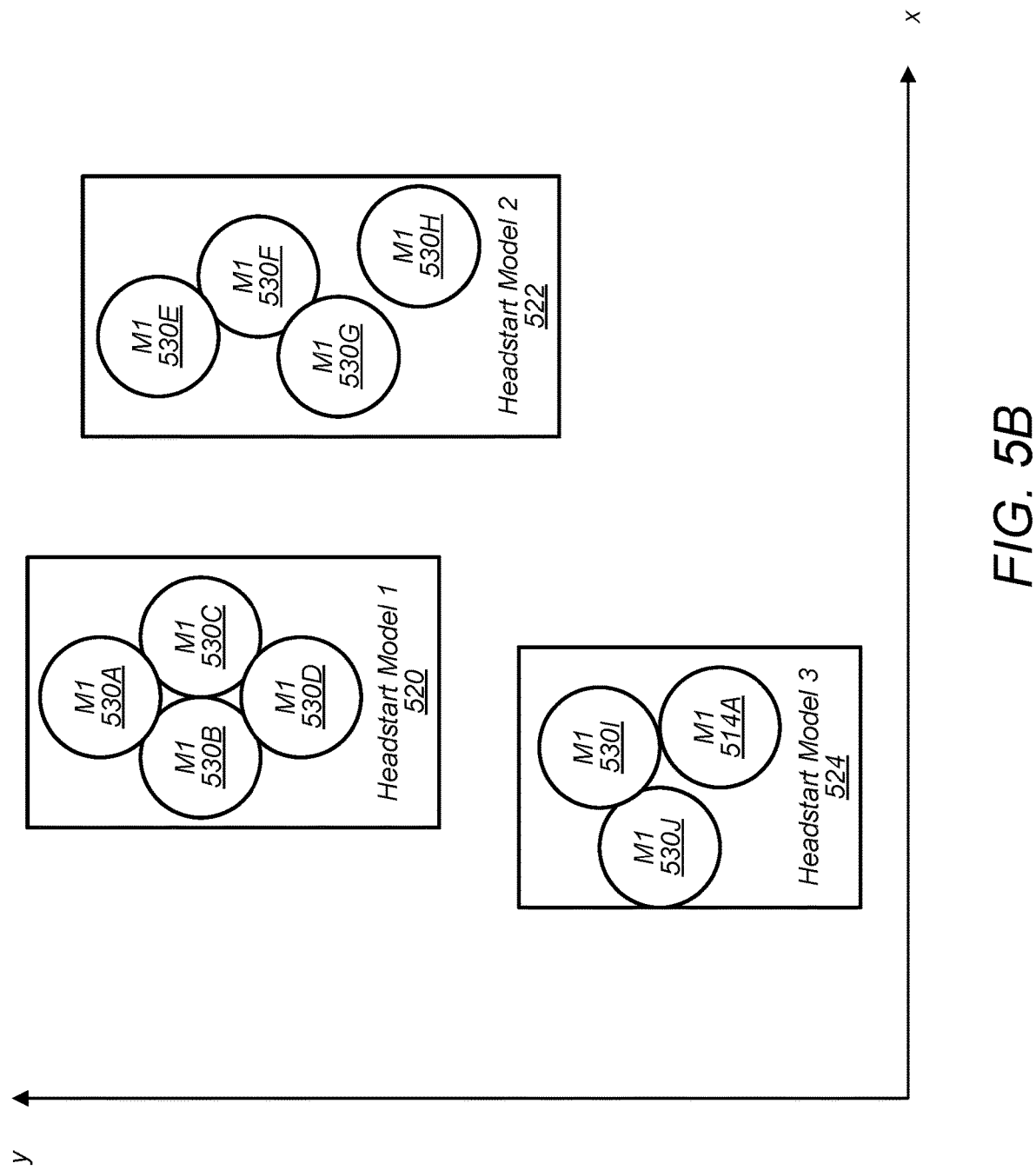
FIG. 5B is a block diagram illustrating clusters of clusters of trained machine learning algorithms of a federated machine learning model in accordance with various embodiments.

As discussed in additional detail in reference to FIGS. 5A and 5B, when transaction request analysis module 122 and a user device portion 124 of the federated machine learning model is installed on user device 120, the user device portion 124 of the federated machine learning model may be a "headstart model" that is selected for user device 120 based on various characteristics of user device 120 (e.g., where user device 120 is located, what type of hardware and software is installed on user device 120, etc.). As the headstart model is used, it may be updated (e.g., weights may be adjusted) according to circumstances at user device 120. This may be particularly useful in embodiments in which the federated machine learning model is trained to identify deviations in the circumstances surrounding receiving transaction request 102. As a user device 120 is used, user device portion 124 of the federated machine learning model can be revised to reflect user behavior and updated device information. In instances where a change in user device portion 124 of the federated machine learning model is distributed by server computer system 110 (e.g., in response to receiving a ground truth indication, as part of a scheduled update), synchronization module 224 is operable to update user device portion 124 of the federated machine learning model to reflect that change. In various embodiments, synchronization module 224 is operable to check for updates regularly and/or receive updates pushed by server computer system 110.

After sending user device scores 230, optional transaction request evaluation factors 232, and an indication of transaction request 234, user device 120 is configured to receive a response to transaction request 102. In some instances, the response will be simply to grant or deny transaction request 102. In other instances, the response will be "step-up challenge" asking user 104 provide additional information (e.g., by performing an image recognition challenge such as identifying which of a series of pictures has a motorcycle in it) or for user device 120 to collect additional information (e.g., additional transaction request evaluation factors). Step-up challenges as discussed in additional detail in reference to FIGS. 6D and 8.

Accordingly, in various embodiments, user device 120 is operable to collect transaction request evaluation factors (including user behavior information, device information, and/or user information) and to analyze the collected transaction request evaluation factors using a local portion of a federated machine learning model and without sending some or all of the collected information to server computer system 110, which reduces privacy risk.

Edge Servers

Figure 3:
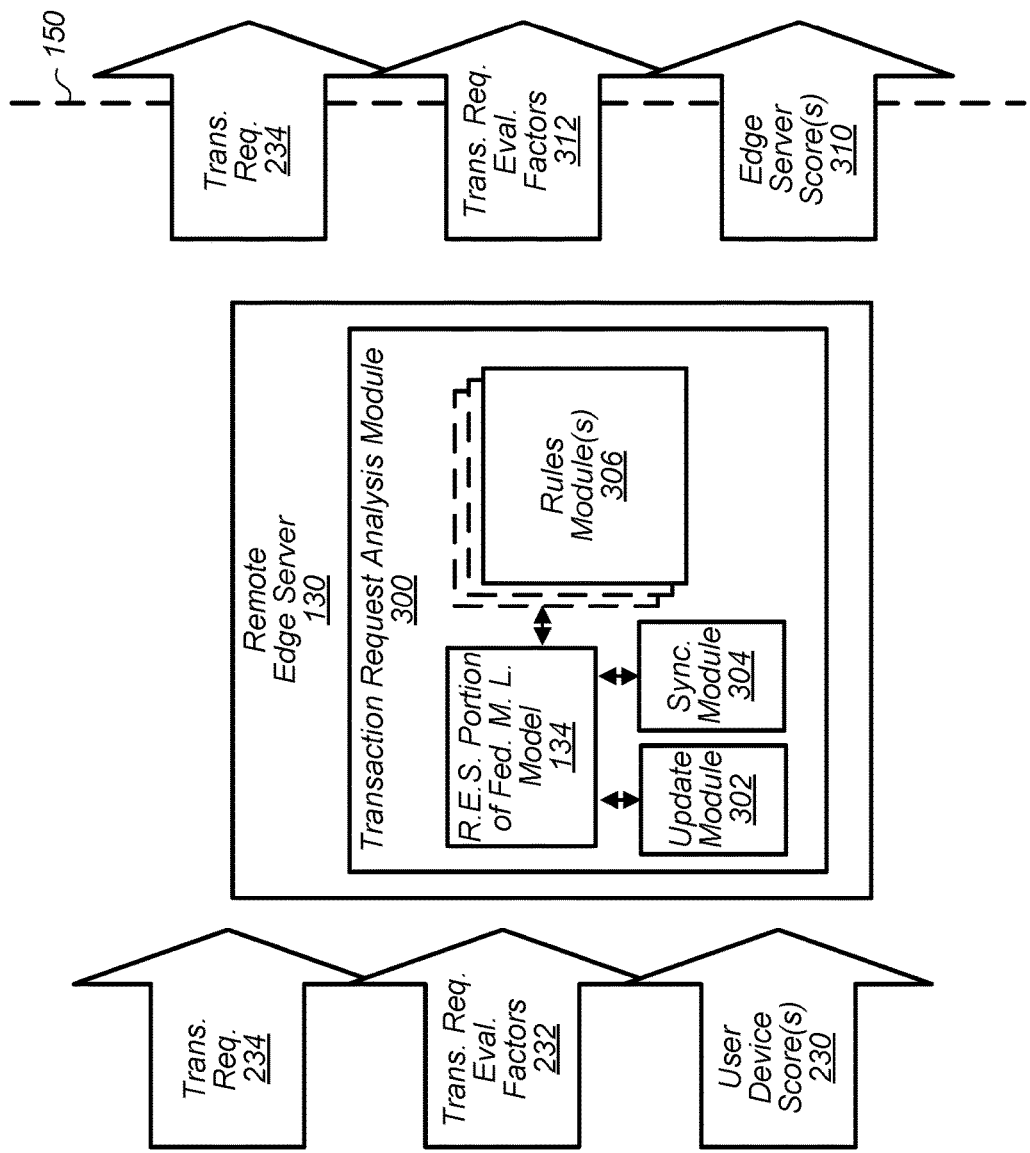
FIG. 3 is an expanded block diagram of the remote edge server of FIG. 1 in accordance with various embodiments.

FIG. 3 is an expanded block diagram illustrating remote edge server 130 (and components thereof) in additional detail. In various embodiments, remote edge server 130 optionally includes a transaction request analysis module 300 that is similar to the transaction request analysis module 122 of user device 120 except that no data collection and abstraction module 220 is present. In various embodiments, no data collection and abstraction module 220 is present because remote edge server 130 receives transaction request evaluation factors 232 from user device 120 and does not otherwise collect transaction request evaluation factors. As discussed herein, in various embodiments, transaction request analysis module 300 is operable to apply transaction request evaluation factors 232 (and in embodiments indication of transaction request 234 and/or user device scores 230) to a remote edge server portion 134 of the federated machine learning model to generate edge server scores 310.

As discussed above, in various embodiment remote edge server 130 (and local edge server 140), may be any of a number of advanced edge servers that are disposed at opposite ends of network boundary 150 (across which communication includes use of a wide area network). Unlike less advanced devices operable to facilitate communication across a wide area network remote edge server 130 (and local edge server 140) are operable to perform more computationally intensive processing such as collecting information and applying it to a machine learning models. In embodiments in which remote edge server 130 includes a transaction request analysis module 300, transaction request analysis module 300 is operable to apply transaction request evaluation factors 232 (and in embodiments and indication of transaction request 234 and/or user device scores 230) to a remote edge server portion 134 of the federated machine learning model to generate edge server scores 310. In various embodiments, applying transaction request evaluation factors 232 (and other information in certain embodiments) to remote edge server portion 134 of the federated machine learning model is performed in a similar manner as by transaction request analysis module 122 except that the portions of federated learning model and inputs thereto differ. The generation of edge server scores 310 by applying transaction request evaluation factors 232 (and other information in certain embodiments to remote edge server portion 134 of the federated machine learning model is discussed in additional detail in reference to FIG. 5A.

In addition to performing calculations for a particular user device 120 (e.g., so user device 120, which may be operating on a limited power supply such as a battery, can conserve power), in various embodiments remote edge server 130 is operable to receive collected information from a plurality of user devices 120. In an enterprise setting (such as in an office building or on a college campus), such collected information may be useable to identify deviations in behavior that warrant further investigation or denial of a transaction request 102. If the usage information and device information of a particular user device 120 suddenly deviates not only from its prior patterns but is an outlier among other user devices 120, then that particular user device 120 may by flagged for further investigation or prevented from submitting transaction requests 102. For example, if temperature and pressure readings collected by particular user device 120 suddenly deviates from other user device 120 communicating with remote edge server 130, this may indicate that the particular user device 120 is being used in a different location, which may be as a result of theft of the particular user device 120. Such deviations may be detected by applying the transaction request evaluation factors 232 (and in embodiments indication of transaction request 234 and/or user device scores 230) to a remote edge server portion 134 of the federated machine learning model to produce remote edge server scores 310. If remote edge server scores 310 suddenly change from a previously stable pattern, it may be the case that malicious activity such as a takeover of user device 120 or a user account associated with user 104.

In various embodiments, remote edge server 130 is operable to send an indication of transaction request 234, one or more transaction request evaluation factors 312, and one or more edge server scores 310 across network boundary 150. In some embodiments, one or more transaction request evaluation factors 312 are the same as transaction request evaluation factors 232 received by remote edge server 130 (i.e., remote edge server 130 merely passes along the transaction request evaluation factors 232). In other embodiments, just as user device 120 does not send transaction request evaluation factors that were used to generate user device scores 230, remote edge server 130 does not send transaction request evaluation factors that were used to generate edge server scores 310. In such embodiments, some or all of transaction request evaluation factors 232 (especially factors that are sensitive information) do not cross network boundary 150 and are not received by server computer system 110, rather edge server scores 310 generated from such transaction request evaluation factors 232 using remote edge server portion 134 of the federated machine learning model are sent instead. As discussed herein, doing so reduces risks associated with storing and communicating sensitive information. In various embodiments, remote edge server 130 also passes along user device scores 230, although in other embodiments user device 120 is operable to communicate user device scores 230 to server computer system 110 without sending user device scores 230 through remote edge server 130.

As with transaction request evaluation module 122 of user device 120, in various embodiments, transaction request analysis module 300 includes one or more rules modules 306. In various embodiments, rules modules 306 are operable to make various decisions based on edge server scores 310 and/or user device scores 230 (e.g., whether to deny a transaction request because the edge server scores 310 and/or user device score 230 for a particular transaction request differs from the established trend by more than a standard deviation). In some of such embodiments, rules modules 306 may be operable to make a limited set of decisions without communicating with server computer system 110. In some embodiments, such rules may simply deny transaction requests 102 that represent obvious deviations or to ask for additional information from user 104 prior to communicating with server computer system 110. In some embodiments, rules modules 306 may operate behind scenes from the perspective of user 104. In such embodiments, rather than asking user 104 for additional information, rules modules 306 is operable to communicate with user device 120 to cause data collection and abstraction module 220 to collect additional information for analysis. For example, such a second collection may collect a larger set of information that is useable to generate additional users scores 230 and/or edge server scores 310 to send to other components of computer system 100.

As with user device portion 124 of the federated machine learning model, remote edge server portion 134 of the federated machine learning model is operable to be updated (e.g., by adjusting model weights) by an update module 302 as transaction request evaluation factors 232 are received and evaluated. Such updates may allow for aligning remote edge server portion 134 of the federated machine learning model with changing usage patterns such that a sudden deviation is more apparent. Further, in various embodiments, as with user device portion 124 of the federated machine learning model, remote edge server portion 134 of the federated machine learning model may be initialized using a headstart model (e.g., a model that has been trained by other remote edge servers 130 having similar characteristics). Additionally, as with user device portion 124 of the federated machine learning model, in instances where a change in remote edge server portion 134 of the federated machine learning model is distributed by server computer system 110 (e.g., in response to receiving a ground truth indication), synchronization module 304 is operable to update remote edge server portion 134 of the federated machine learning model to reflect that change. In various embodiments, synchronization module 304 is operable to check for updates regularly and/or receive updates pushed by server computer system 110.

In various embodiments, accordingly, having a remote edge server 130 apply a separate portion of federated machine learning model facilitates using additional information to evaluate transaction requests 102. Rather than merely determining whether a deviation is detected in a particular user device 120 based on transaction request evaluation factors collected by user device 120, remote edge server 130 is operable to detect deviations for the user device 120 from among other user devices (not shown) with which remote edge server 130 has communicated. This may be especially useful in an enterprise setting where various user devices 120 are all associated with the enterprise (e.g., a plurality of laptops disposed at desks in an office building that use remote edge server 130 to communicate with server computer system 110). If one particular user device 120 has not deviated from its usual pattern substantially, then malicious action may not be detected based on a local deviation along. But if the pattern for a particular user device 120 is evaluated along with other patterns from similar user devices, a malicious action by the particular user device 120 may be more detectable if it deviates from patterns of other user devices. Moreover, because remote edge server 130 is on the same side of network boundary 150 and is applying a remote edge server portion 134 of the federated machine learning model, such deviations may be detected without exposing sensitive information. This may be especially advantageous in an enterprise setting. For example, a deviation in access requests to sensitive health information can be detected without exposing the health information to computer systems outside of the enterprise, a deviation can be detected based on a change in personally identifiable user behavior information without exposing personally identifiable information to computer systems outside of the enterprise).

Similarly, while the structure has been omitted for the sake of brevity, in various embodiments, local edge server 140 may also include a transaction request analysis module that may operate similarly to transaction request analysis module 300 except that the transaction request analysis module of local edge server applies transaction request evaluation factors 232 (from user device 120) and/or transaction request evaluation factors 312 (from remote edge server 130) to a local edge server portion 144 of federated machine learning model (shown on FIG. 1).

As discussed herein, both user device 120 and remote edge server 130 may be referred to as "remote computer systems" because they are remote from server computer system 110 (i.e., separated by a network boundary 150 such that communication with server computer system 110 includes the use of a wide area network). In various embodiments, either or both remote computer systems are operable to apply transaction request evaluation factors to respective "remote portions" of a federated machine learning model to determine "remote computer system scores" that are useable to evaluate the transaction request 102.

As discussed herein, therefore, recitations of a remote computer system "receiving" transaction request evaluation factors can include a transaction request analysis module 122 of user device 120 receiving transaction request evaluation factors collected by user device 120. A remote computer system "receiving" transaction request evaluation factors can also include a transaction request analysis module 300 of remote edge server 130 receiving transaction request evaluation factors 232 from user device 120. Similarly, a "remote computer system score" may be user device scores 230 or edge server scores 310, depending on the context.

Server Computer System

Figure 4:
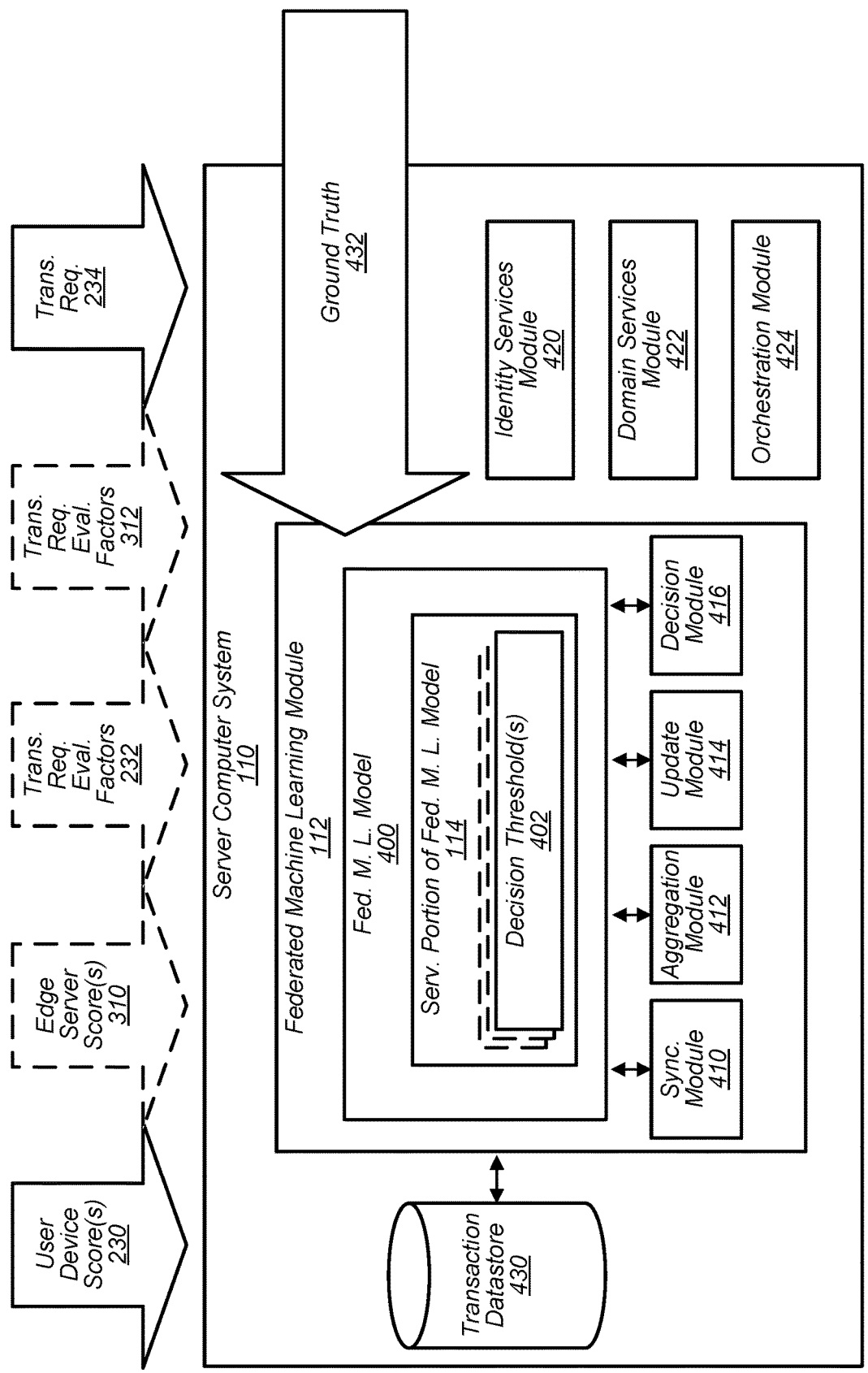
FIG. 4 is an expanded block diagram of the server computer system of FIG. 1 in accordance with various embodiments.

FIG. 4 is an expanded block diagram illustrating server computer system 110 (and components thereof) in additional detail. In the embodiments illustrated in FIG. 4, server computer system 110 includes federated machine learning module 112 and server portion 114 of federated machine learning model as well as additional components. Federated machine learning module 112 is operable to generate and maintain a federated machine learning model 400 which includes server portion 114 of the federated machine learning model as well as the various other portions 124, 134, and/or 144 shown in FIG. 1. As shown in FIG. 4, server portion 114 includes one or more decision thresholds 402. In various embodiments, federated machine learning module 112 also includes a synchronization module 410, an aggregation module 412, and an update module 414 that are operable to maintain federated machine learning model 400 as well as a decision module 416 that is operable determine how to respond to transaction request 102. Server computer system 110 generates and maintains federated machine learning model 400 using information about transaction requests stored in transaction datastore 430 and/or indications of ground truth 432. Additionally, in various embodiments server computer system includes other modules such as an identity services modules 420, a domain services module 422, and an orchestration module 424.

Federated machine learning module 112 is operable to generate and train federated machine learning model 400 using a dataset of previous transaction requests stored in transaction datastore 430. In some instances, training is supervised or partially supervised using indications of ground truth 432. As used herein, "ground truth" refers to information that is known to be real or true and is typically input by human analysts or users (e.g., fraud reports filed on certain prior transaction requests, results of audits of prior transaction requests). As discussed herein, in various embodiments federated machine leaning model 400 is divisible into server portion 114 as well as one or more remote computer system portions (i.e., user device portion 124 and/or remote edge server portion 134). In some embodiments, federated machine learning model 400 may also include a local edge server portion 144. Subsequent to training, the various portions may be distributed across computer system 100 to evaluate subsequent transaction requests (e.g., transaction request 102).

In various embodiments, federated machine leaning model 400 takes various inputs (e.g., transaction request evaluation factors) and uses the inputs to calculated weighted scores. In such embodiments, federated machine learning model 400 is divisible into portions such that different subsets of transaction request evaluation factors are applied to the different portions, and the scores generated from the various portion can be analyzed separately or together. But because the sets of inputs are separate, the various portions are operable to generate their separate scores without needing communicate with computer systems generating the other scores. For example, a particular federated machine learning model 400 may take six inputs. If the first three inputs are used together to make a first score and the second three inputs are used together to make a second score, the portions of federated machine learning model 400 used the generate the first and second scores may be separated into different portions. The structure of federated machine learning model 400 and various embodiments explaining how it can be separated into different portions are discussed in reference to FIG. 5A.

As with the other portions of federated machine learning model 400, server portion 114 is useable to generate one or more scores. In various embodiments, such server scores (e.g., server scores 500 shown in FIG. 5A) are generated by applying transaction request evaluation factors 232 (collected by user device 120) and/or transaction request evaluation factors 312 (collected by user device 120 and sent to server computer system 110 via remote edge server 130) and/or indication of transaction request 234 (including transaction information) to server portion 114. In some embodiments user device 120 can collect a set transaction request evaluation factors and generate user device scores 230 using some of such factors. User device 120 can send a subset of transaction request evaluation factors 232 that were not used to generate user device scores 230. Similarly, edge servers 130, 140 are operable to generate edge server scores 310 and send a subset of transaction request evaluation factors 312 that were not used to generate user device scores 310.

In other embodiments, user device 120 and/or edge servers 130, 140 may use particular transaction request evaluation factors (such as non-sensitive information about times of user device 120 usage) to generate scores and still send the particular transaction request evaluation factors to server computer system 110. Thus, in some embodiments, some transaction request evaluation factors (e.g., personally identifiable information or other sensitive information) is collected and analyzed, but not sent to server computer system 110 for analysis. In some embodiments, federated machine learning module 112 is operable (e.g., using update module 414) to adjust server portion 114 by adjusting weights used to calculate server scores as well as adjusting decision thresholds 402 in response to receiving transaction request 102.

Additionally, in various embodiments, federated machine learning module 112 may also apply to server portion 114 information that was not collected by user device 120. For example, server computer system 110 may use records of prior transactions stored in transaction datastore 430 (e.g., what was requested, whether the prior requests were granted). Additionally, federated machine learning module 112 may apply other information such as records of user accounts and interactions between user accounts, records of funding instruments on file, analyses of a secure resource (e.g., what file type secure resource is, access patterns of the particular secure resource) stored at server computer system 110 to which access is requested in transaction request 102.

Server portion 114 includes one or more decision thresholds 402 that are used by decision module 416 to evaluate server scores, user device scores 230, and/or edge server scores 310 and determine how to respond to transaction request. In some embodiments, decision module 416 evaluates scores generated for a particular requested transaction and compares the scores to decision thresholds. In some embodiments, decision module 416 includes rule-based decision making such that if the scores exceed the decision thresholds 402 by a large amount, transaction request 102 is granted; if the scores are within a range of decision thresholds 402 a step-up operation is initiated; and if the scores are below decision thresholds 402 by a large around, transaction request 102 is denied. In various embodiments, different rules may be applied depending on circumstances (e.g., different rules for different regions, different rules for different enterprise customers, different rules for individual users 104 versus users 104 associated with an enterprise, etc.)

In various instances, different decision thresholds 402 may be used for different types of transaction request 102. For example, a first decision threshold 402 may be used for transaction requests 102 originating from user devices 120 located in country A while a second decision threshold 402 may be used for transaction requests 102 originating from user devices 120 located in country B. In various embodiments, decision thresholds 402 are constantly (e.g., in response to every transaction request 102) or regularly (e.g., every hour, every day, etc.) being adjusted by federated machine learning module 112 (e.g., using update module 414) as transaction requests 102 (and in some embodiments, indications of ground truth 432) are received and analyzed. In such embodiments, federated machine learning module 112 is able to adjust federated machine learning model 400 to account for global patterns while leveraging the federated nature of the model to allow for detection of trends in particular user device 120 or among user devices 120 communicating with particular edge servers 130 or 140. Moreover, because in various embodiments, the final decision on how to respond to a particular transaction request 102 is made using decision thresholds 402, server computer system 110 is ultimately still in control of evaluating transaction request 102, so even though portions of federated machine learning model 400 have been distributed across computer system 100, a malicious attack on a particular user device 120 and/or edge server 130 or 140 is not alone sufficient to improperly approve a particular transaction request 102.

In various embodiments, decision thresholds 402 may be set for different authentication factors. In some instances, decision thresholds 402 may be set by analysts, but in other embodiments machine learning may be used to set and/or adjust decision thresholds 402 as discussed herein. In various embodiments, a knowledge factor for a transaction request may be satisfied by authenticating a username and password (included in indication of transaction request 234) using identity services module 420 as discussed below. In such an embodiment, such a determinization is rule-based (e.g., is there a match: yes or no?) and does not leverage machine learning. Whether a second authentication factor has been met, however, is established using federated machine learning model 400 and the various scores calculated therewith. In various embodiments, various scores (e.g., user device scores 230, edge server scores 310, server scores calculated by server computer system 110) may be used to determine whether an inherence factor has been met and/or whether a possession factor has been met. For example, various scores generated using user behavior information may be used to determine whether user behavior patterns have materially deviated from prior patterns (e.g., user device 120 is suddenly being held in a different hand and used in a different time period), and establishing that no such deviation is detected may be sufficient to establish an inherence factor for user 104. If the inherence factor is sufficiently established, computer system 100 concludes that user 104 for the present transaction request 102 has been sufficiently determined to be the same person as prior transaction requests. Similarly, patterns in user information may also be used to establish inherence (e.g., based on facial scans of user 104).

Similarly, various scores generated using user device information may be used to determine whether a profile of user device 120 has materially deviated from prior patterns (e.g., user device 120 is suddenly coupled to a different set of WiFi networks and has different peripheral devices), and establishing that no such deviation is detected may be sufficient to establish a possession factor for user device 120. If a possession factor is sufficiently established, computer system 100 concludes that a particular user device 120 that is associate with the present transaction request 102 has been sufficiently determined to be the same user device 120 as prior transaction requests. Whether inherence or possession factors are established is based on one or more authentication factor thresholds. In various embodiments, there is an inherence factor threshold and a possession factor, but in other embodiments multiple thresholds are used (e.g., 5 of 8 possession subthresholds must be met to establish a possession factor, 3 of 5 inherence subthresholds must be met to establish an inherence factor). In various embodiments, different authentication factors may be used for different populations of user devices 120 or edge servers 130 (e.g., a first set of thresholds in region A and a second set of thresholds in region B).

In various embodiments, synchronization module 410 is operable to communicate with synchronization modules 224 and 304 to distribute revisions to portions 124, 134, and/or 144 of the federated machine learning model. As discussed herein, update modules 222 and 302 may revise of user device portions 124 and edge server portions 134, 144. In some of such embodiments, indications of such revised portions 124, 134, 144 may be sent to server computer system 110 and used to update (e.g., using update module 414) federated machine learning model 400. In some embodiments, revised portions 124, 134, 144 from various user devices 120 and/or edge servers 130, 140 may be aggregated together (e.g., by averaging performing other statistical processes on changed values applied to the portions 124, 134, 144) and used to update federated machine learning model 400. In some embodiments, aggregations may also be used to generate the headstart models discussed in reference to FIG. 5B.

Transaction datastore 430 may be implemented using any of a number of computer storage devices. Transaction datastore 430 may store records associated with any number (e.g., thousands, millions, billions, etc.) of previous transaction requests, transaction information for the requested transactions, an outcome of the transaction, and any indications of ground truth 432 such as fraud reports. Records in transaction datastore 430 are used to generate and train federated machine learning model 400 using any of a number of suitable machine learning techniques. As transaction requests 102 are received and analyzed, records are added to transaction datastore in various embodiments.

In various embodiments, server computer system 110 includes identity services module 420, which is operable to authenticate information such as access tokens, user names and passwords, and cryptographic indicators that are used to secure computer system 100. In various embodiments, hashes of user names and passwords are compared to hashes of usernames and passwords included with indications of transaction request 234, for example. In various embodiments, domain services module 422 is operable to facilitate the requested transaction once transaction request 102 has been granted. In various embodiments, therefore, domain services module 422 is operable to transfer funds between accounts, cause secured information to be sent to user device 120, and/or to cause pages of a secure website to be sent to user device 120 for display. In various embodiments, orchestration module 424 is operable to activate or deactivate additional computation resources to scale the computational capabilities of server computer system 110 to handle the current workload of transaction requests 102.

Thus, in various embodiments, server computer system 110 is operable to generate a federated machine learning model 400 and distribute portions 124, 134, 144 to various components of computer system 100 such that some or all transaction request evaluation factors (especially personally identifiable information or other sensitive information) may be analyzed by user device 120, remote edge server 130, and/or local edge server 140 without being sent to server computer system 110. Because server computer system 110 is operable to adjust federated machine learning model 400 (and update and distributed revised portions 124, 134, 144 accordingly) server computer system 110 is still able to adjust to global changes. Moreover, because server computer system 110 ultimately decides on whether to grant a particular transaction request 102, security in decision making is not compromised despite some analysis being performed by potentially more vulnerable components of computer system 100. Further, server computer system 110 is operable to adjust decision thresholds 402 and/or apply different sets of decision thresholds 402 in different circumstances. Thus, in various instances, sensitive information can be applied to advanced machine learning models to determine how to respond to transaction requests without reception and storage of sensitive information at server computer system 110.

Federated Machine Learning Model

FIG. 5A is a block diagram of a simplified example of the federated machine learning model 400. In FIG. 5A, federated machine learning model 400 includes two portions: a user device portion 124 and a server portion 114. As discussed herein, in various embodiments federated machine learning model 400 includes a server portion 114 and any combination of portions 124, 134, and 144. It will also be understood that the example shown in FIG. 5A is simplified for the sake of explanation.

Federated machine learning model 400 in FIG. 5A has six data inputs 510: D1 510A, D2 510B, D3 510C, D4 510D, D5 510E, and D6 510F. Data inputs D1 510A, D2 510B, and D3 510C are inputs to user device portion 124 and data inputs D4 510D, D5 510E, and D6 510F are inputs to server portion 114. In the embodiment shown in FIG. 5A, data inputs are used to generate four variables: V1 512A, V2 512B, V3 512C, and V4 512D. As shown in FIG. 5A, in various embodiments, some variables 512 are generated using more than one data input 510, and some data inputs 510 are used to generate more than one variable 512. Data inputs 510 can be any of the transaction request evaluation factors discussed herein (e.g., user behavior information, user device information, or user information collected by user device 120; information about other transactions stored in transaction datastore 430, etc.) or transaction information for the particular transaction request 102. Variables 512 may be generated based on data inputs 510 (e.g., position of user device 120 based on data inputs from multiple gyroscopes; user facial recognition match calculated by user device 120, etc.). In some embodiments, variables 512 are calculated using simple arithmetic operations, but in other embodiments more complex calculations may be made (e.g., statistical analysis such as means and standard deviations; derivative or integrals) to generate variables 512 from data inputs 510. While the federated machine learning model 400 in FIG. 5A includes only six data inputs 510 and four variables, in various embodiments dozens or hundreds of each may be used. As shown in FIG. 5A, user device portion 124 and server portion 114 use data inputs 510 that are completely independent; none of D1-D3 510A-C are taken as input by server portion 124 and none of D4-D6 510D-F are taken as input by user device portion 124. In other embodiments, however, some data inputs 510 may be used in more than one portion 114, 124, 134, 144.

Once variables 512 have been generated, variables 512 are applied to machine learning algorithms 514 to generate scores. In the case of user device portion 124, machine learning algorithm M1 514A takes a weighted sum of variables V1 and V2 ($a*V1+b*V2$) to generate user device scores 230. Similarly, in server portion 114, machine learning algorithm M2 514B takes a weighted sum of variables V3 and V4 ($c*V1+d*V2$) to generate server scores 500. As discussed herein, weights a, b, c, and d may be adjusted using any of a number of machine learning algorithms including a wide range of supervised and semi-supervised algorithms, that are non-parametric or of the neural computation nature. Further, the weighted sums shown in FIG. 5A are a simplified example. Any suitable machine learning algorithm may be applied to variables 512.

As discussed herein, adjustments to machine learning algorithms 514 may be made locally (e.g., by an update module 222 of a user device 120, by an update module 302 of an edge server 130 or 140), or by an update module 414 of a server computer system 110) or by server computer system 110 and distributed to the rest of computer system 100. Further, as discussed herein, different user devices 120 and edge servers 130, 140 are operable to adjust their respective portions 124, 134, and 144 as transaction requests 102 are received and analyzed. Accordingly, even if two identical copies of user device portion 124 are sent to two different user device 120, after some time has passed, the two user device portions 124 will have diverged from each other as a result of receiving transaction requests 102. For example, if a first user 104 of a first user device 120 holds her user device 120 in her right hand and a second user 104 of a second user device 120 holds his user device 120 in his left hand, the model weights for their respective user device portions 124 will differ accordingly in various embodiments.

As discussed herein, scores such as user device scores 230 and server scores 500 may be evaluated using decision thresholds 402 to determine a response (e.g., grant, deny, step-up) for a particular transaction request 102. As discussed above, decision thresholds 402 may be adjusted dynamically using any of a number of machine leaning algorithms including a wide range of supervised and semi-supervised algorithms, that are non-parametric or of the neural computation nature. Federated machine learning model 400 may be adjusted automatically (e.g., by adjusting model weights such as weights a, b, c, and d) or by adding or removing layers of federated machine learning model 400, adding or removing data inputs 510, adding or removing variables 512, change how variables 512 are calculated, etc. Such adjustment may be made in response to indication of ground truth 434 and/or based on performance data (e.g., increasing thresholds 402 in response to determining that a false positive rate was lower than expected, removing data inputs 510 in response to determining that such data inputs had little effect on the final scores and were consuming computational resources).

Headstart Models

FIG. 5B is a block diagram illustrating clusters of trained machine learning algorithms (including machine learning algorithm M1 514A of FIG. 5A) of a federated machine learning model 400 in accordance with various embodiments. As discussed below, the various trained machine learning algorithms in FIG. 5B were trained by various user device 120 and information about them was sent back to server computer system 110 (e.g., by update modules 222). Having received the trained machine learning algorithms, server computer system 110 has performed a clustering analysis (e.g., using a k-means algorithm, a k-nearest neighbor algorithm, or other suitable clustering algorithm) and grouped the trained machine learning algorithms together. Machine learning algorithm M1 514A of FIG. 5A has been grouped with M1 530I and M1 530J for example. In FIG. 5B, three clusters are shown, although any number of clusters may be identified among machine learning algorithms. In various embodiments, trained machine learning algorithms within a cluster may be aggregated together (e.g., by averaging model weights, by finding a center of the cluster and calculating model weights by scaling model weights of clustered trained machine learning algorithms) to generate the "headstart models." As used herein, "headstart models" are generic models that are generated from models that have been trained by components of computer system 100 (e.g., a user device 120, a remote edge server 130). Models trained by different components are clustered (e.g., clustered according to attributes of the various user devices that trained the models) and the clusters are useable to generate a headstart model for the cluster. Thus, from the cluster of M1 530A-D headstart model 1 520 has been generated; from the cluster of M1 530E-H headstart model 2 522 has been generated; and from the cluster of M1 514A, M1 530I, and M1 530J headstart model 3 524 has been generated.

As discussed herein, when a new user device 120 is added to computer system 100, rather than having to initialize its user device portion 124 from scratch (e.g., starting with random values and training as transition requests 102 are received), the new user device 120 can receive a headstart model that corresponds to similar characteristics that new user device 120 shares. For example, it may be the case that M1 530A-D correspond to user devices 120 that are mobile phones in the United States, M1 530E-H correspond to user device 120 that are laptops in Spain, and M1 514A, M1 530I, and M1 530J correspond to tablet computers in Japan. Because new user device 120 is also a tablet computer in Japan, new user device 120 may be sent headstart model 3 524 upon being added to computer system 110 (e.g., when transaction request analysis module 122 is installed and prior to the reception of any transaction requests 102 by new user device 120).

Similarly, headstart models may be distributed to newly installed (or reset) edge servers 130 and 140. For example, a first remote edge server 130 that is associated with a large enterprise in the United States may be sent a headstart model generated from portions 134 of other remote edge servers 130 that are associated with large enterprises in the United States. Similarly, a second remote edge server 130 that services a university may be sent headstart models generated from portions 134 of other remote edge servers 130 that are associated with universities. Similarly, local edge server 140 may be sent headstart models generated from portions 144 of other local edge servers 140 having similar characteristics. While hardware type, geographic location, and entity type are used here as non-limiting examples, any of a number of other characteristics may be used of any level of granularity (e.g., a headstart model generated from user device portions 124 for mobile phones that have 128 GB of internal storage with 11 GB of available space, run version 14.6 of user device operating system 204, that are located in Texas and are used by users 104 of who are left-handed).

Authenticating a Transaction Request Using a Federated Machine Learning Model

FIGS. 6A-6D are flowcharts illustrating various embodiments of a transaction request evaluation method 600 using federated machine learning model 400 in accordance with various embodiments. Method 600 includes actions performed by server computer system 110, user device 120, remote edge server 130, and local edge server 140 including various optional actions that are not performed in all embodiments. These actions are represented in FIGS. 6A-6D as blocks and information passed between components is represent as arrows. As discussed above, network boundary 150 separates user device 120 and remote edge server 130 from server computer system 110 and local edge server 140. Method 600 includes certain steps that may be performed more frequently than others (e.g., generating federated machine learning model 400 at block 602 may be performed less frequently than receiving transaction request 102 at block 606). Additionally, while method 600 includes user device 120 and server computer system 110 analyzing transaction request evaluation factors to generate scores, in some embodiments only user device 120 generates scores with server computer system 110 evaluating the scores to determine how to respond to a transaction request 102 as discussed herein.

Figure 6A:
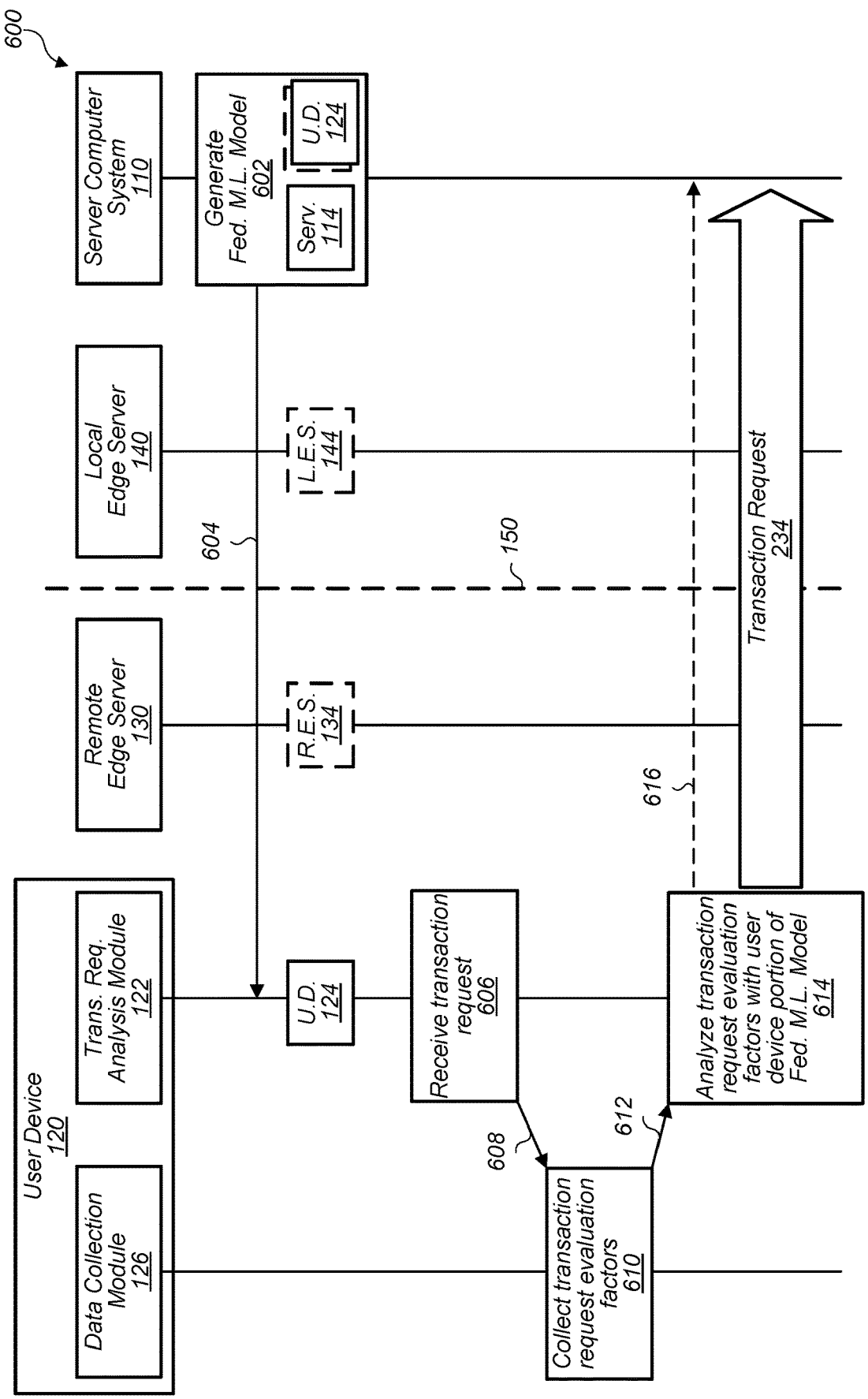
FIGS. 6A-6D are flowcharts illustrating various embodiments of a transaction request evaluation method using a federated machine learning model in accordance with various embodiments.

Referring now to FIG. 6A, at block 602, federated machine learning model 400 is generated. As discussed above, in various embodiments, federated machine learning model 400 includes server portion 114 and any combination of user device portion 124, remote edge server portion 134, and local edge server portion 144. As discussed herein user device portion 124 and remote edge server portion 134 are also referred to herein as remote computer system portions. At line 604, user device portion 124, remote edge server portion 134, and/or local edge server portion 144 are distributed by server computer system 110. In the embodiment shown in FIGS. 6A-6D, user device 120 receives (and stores with transaction requestion analysis module 122) a user device portion 124. Optionally remote edge server 130 receives a remote edge server portion 134 and local edge server 140 receives a local edge server portion 144.

At block 606, user device 120 receives transaction request 102 via transaction request analysis module 122. As discussed herein, user 104 enters transaction information about the requested transaction as they submit transaction request 102. At line 608, transaction request analysis module 122 requests transaction request evaluation factors from data collection module 126. At block 610, data collection module 126 collects various transaction request evaluation factors (e.g., user behavior information, user device information, user information). At line 612, data collection module 126 sends the collected transaction request evaluation factors to transaction request analysis module 122. In various embodiments, transaction request analysis module 122 anonymizes and/or abstracts the transaction request evaluation factors.

At block 614, transaction request analysis module 122 analyzes the transaction request evaluation factors sent by data collection module 126 using user device portion 124 to generate user device scores 230. In various embodiments, the operations described in connection to line 608, block 610, line 612, and block 614 are performed independently of the reception of transaction request 102 at block 606. In some embodiments, the transaction request evaluation factors are continuously collected and/or collected on a regular schedule. Similarly, user device scores 230 may be continuously generated and/or generated on a regular schedule. In such embodiments, deviations in user device scores 230 may be used to identify changes in user behavior, device information, or determine that a different user 104 may be using user device 120 (e.g., by determining that user information has deviated from prior patterns).

In various embodiments, at line 616, user device 120 sends user device scores 230 and/or transaction request evaluation factors to server computer system 110. In various embodiments, user device 120 sends user device scores 230 and/or transaction request evaluation factors via remote edge server 130 and local edge server 140. In other embodiments, however, user device 120 sends user device scores 230 and/or transaction request evaluation factors to server computer system 110 using a separate transmission pathway that does not pass through via remote edge server 130 and local edge server 140. User device 120 communicates an indication of transaction request 234 (e.g., along with user device scores 230 and/or transaction request evaluation factors). As discussed herein, in various embodiments, user device 120 does not send some or all of the transaction request evaluation factors that were used to generate user device score 230.

Figure 6B:
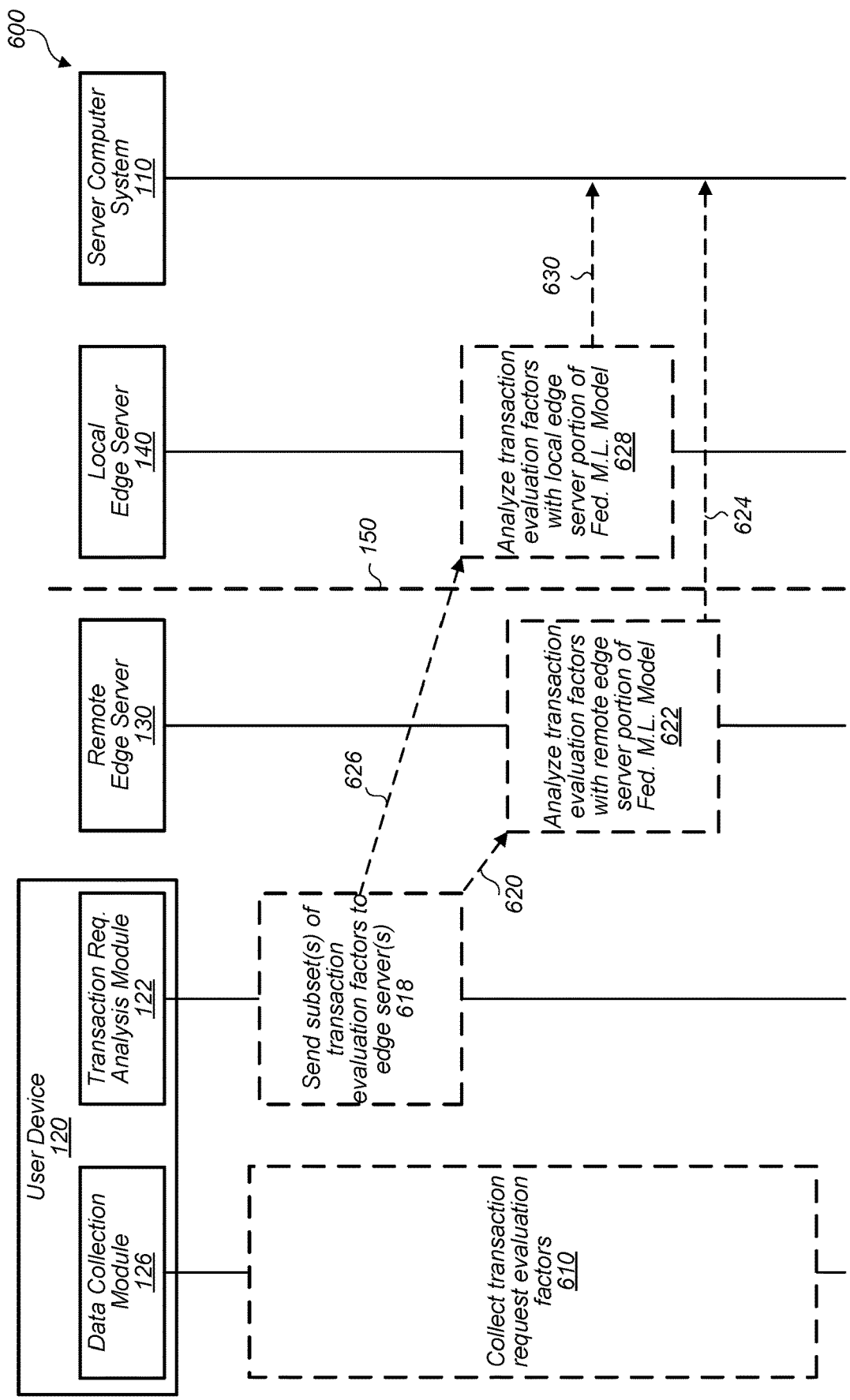
Figure 6C:
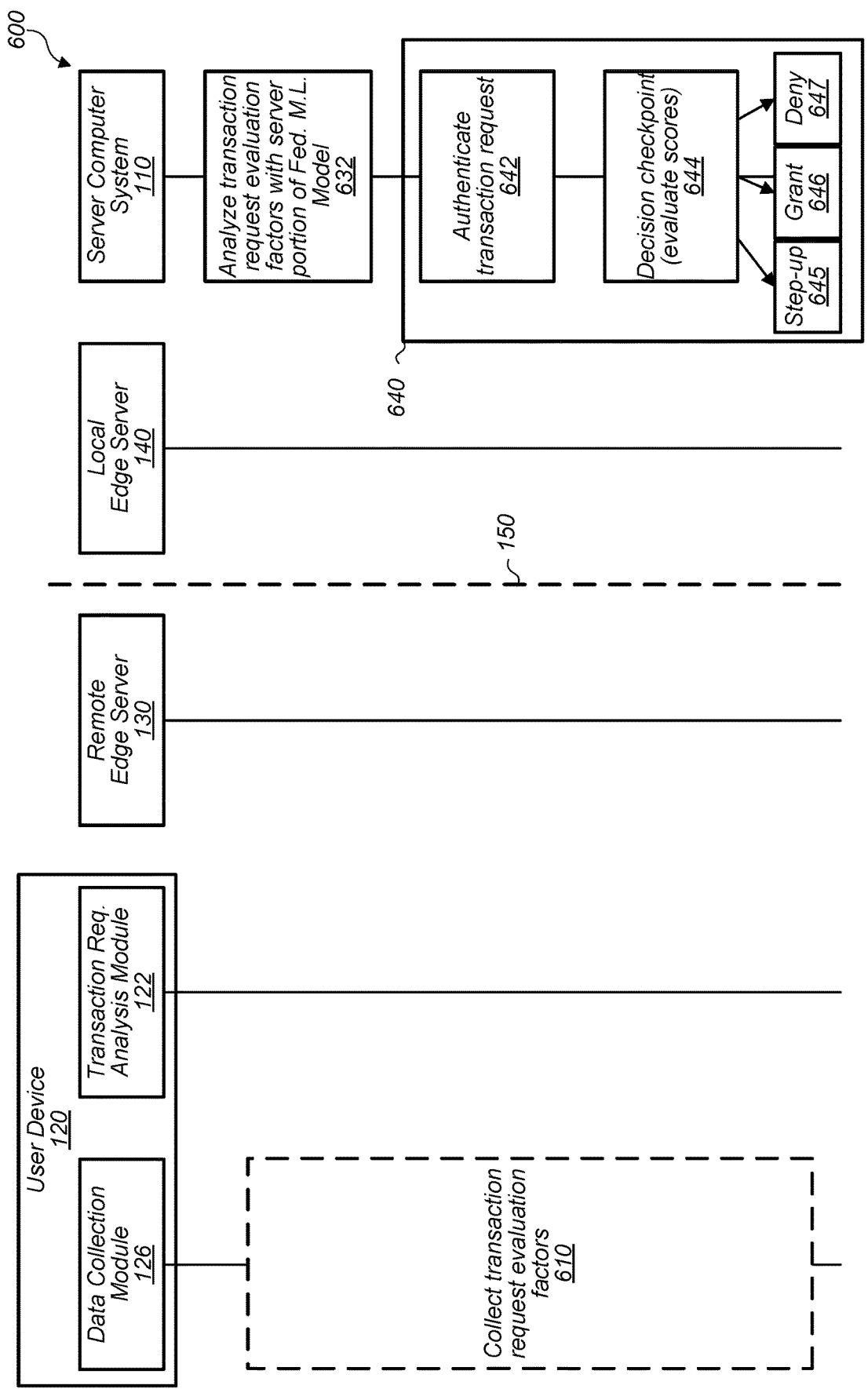

Referring now to FIG. 6B, various optional operations are illustrated. As discussed above, transaction request evaluation factors (block 610) may be continuously collected and/or collected on a regular schedule. At block 618, user device 120 optionally sends subsets of transaction request evaluation factors to remote edge server 130 (line 620) and/or local edge server 140 (line 626). In various embodiments, the subset of transaction request evaluation factors sent to remote edge server 130 at line 620 does not include transaction request evaluation factors used to generate user device scores 230. In other embodiments, however, the subset of transaction request evaluation factors sent to remote edge server 130 at line 620 includes some or all of the transaction request evaluation factors used to generate user scores 230. Similarly, the subset of transaction request evaluation factors sent to local edge server 140 at line 626 does not include transaction request evaluation factors used to generate user device scores 230. In other embodiments, however, the subset of transaction request evaluation factors sent to local edge server 140 at line 626 includes some or all of the transaction request evaluation factors used to generate user scores 230. In some embodiments, the subsets of transaction request evaluation factors sent at line 620 and 626 are identical, but in other embodiments the subset transaction request evaluation factors sent at line 620 and 626 differ (e.g., personally identifiable information is sent to remote edge server 130 but not to local edge server 140).

At block 622, remote edge server 130 generates remote edge server scores 310 by applying received transaction request evaluation factors to remote edge server portion 134. At line 624, remote edge server 130 sends edge server scores 310 to server computer system 110 (via local edge server 140 or via a different transmission pathway). At block 628, local edge server 140 generates remote edge server scores 310 by applying received transaction request evaluation factors to local edge server portion 144. At line 308, local edge server 140 sends edge server scores 310 to server computer system 110. At block 632, server computer system 110 generates remote server scores (e.g., server scores 500) by applying received transaction request evaluation factors to server portion 114.

As discussed above, in various embodiments computer system 100 is configured such that sensitive information does not cross network boundary 150, and can be instead analyzed on user device 120 and/or remote edge server 130. In some embodiments, sending subsets of transaction request evaluation factors from user device 120 to local edge server 140 is performed via remote edge server 130. In some of such embodiments, the subset or transaction request evaluation factors are sent from user device 120 to local edge server 140, analyzed by applying received transaction request evaluation factors to remote edge server portion 134 (block 622), and then some or all of the subset of transaction request evaluation factors are sent across network boundary 150 from remote edge server 130 to locale edge server 140.

As a non-limiting illustration, in some embodiments fifteen transaction request evaluation factors are collected at block 610. In this illustration, the fifteen transaction request evaluation factors (factors A-O) include factors A through E that include personally identifiable information and factors F through I that include other sensitive information. The transaction request evaluation factors A though E are used to generate user device scores 230 at block 614. The remaining ten transaction request evaluation factors (F though O) are sent to local edge server 130. At block 622, transaction request evaluation factors F, G, H, and I are applied by remote edge server 130 to remote edge server portion 134 to generate edge server scores 310. At block 628, transaction request evaluation factors J and K are used by local edge server 140 to generate additional edge server scores 310. Transaction request evaluation factors L, M, N, and O are sent to server computer system 110 for analysis. In other embodiments, however, transaction request evaluation factors may be analyzed be more than one computer system (e.g., user device 120 analyzes factors A through F, and remote edge server 130 analyzes factors D through I).

At block 640, server computer system 110 determines how to response to transaction request 102. At block 642, server computer system 110 authenticates transaction request 102 (e.g., using identity services module 420). If transaction request 102 is authenticated, at block 644, server computer system 110 evaluates the received scores (e.g., user scores 230, edge server scores 310) and/or server scores against one or more decision thresholds 402 to determine how to respond to transaction request 102. As discussed above, in some instances server computer system 110 determines to initiate a step-up operation (block 645), which causes method 600 to advance to block 650. In other instances, server computer system 110 determines to grant transaction request 102 (block 646), which causes method 600 to jump to block 660. In still other instances, server computer system 110 determines to deny transaction request 102 (block 647), which cases method 600 to end and user device 120 to receive an indication that transaction request 102 was denied.

Figure 6D:
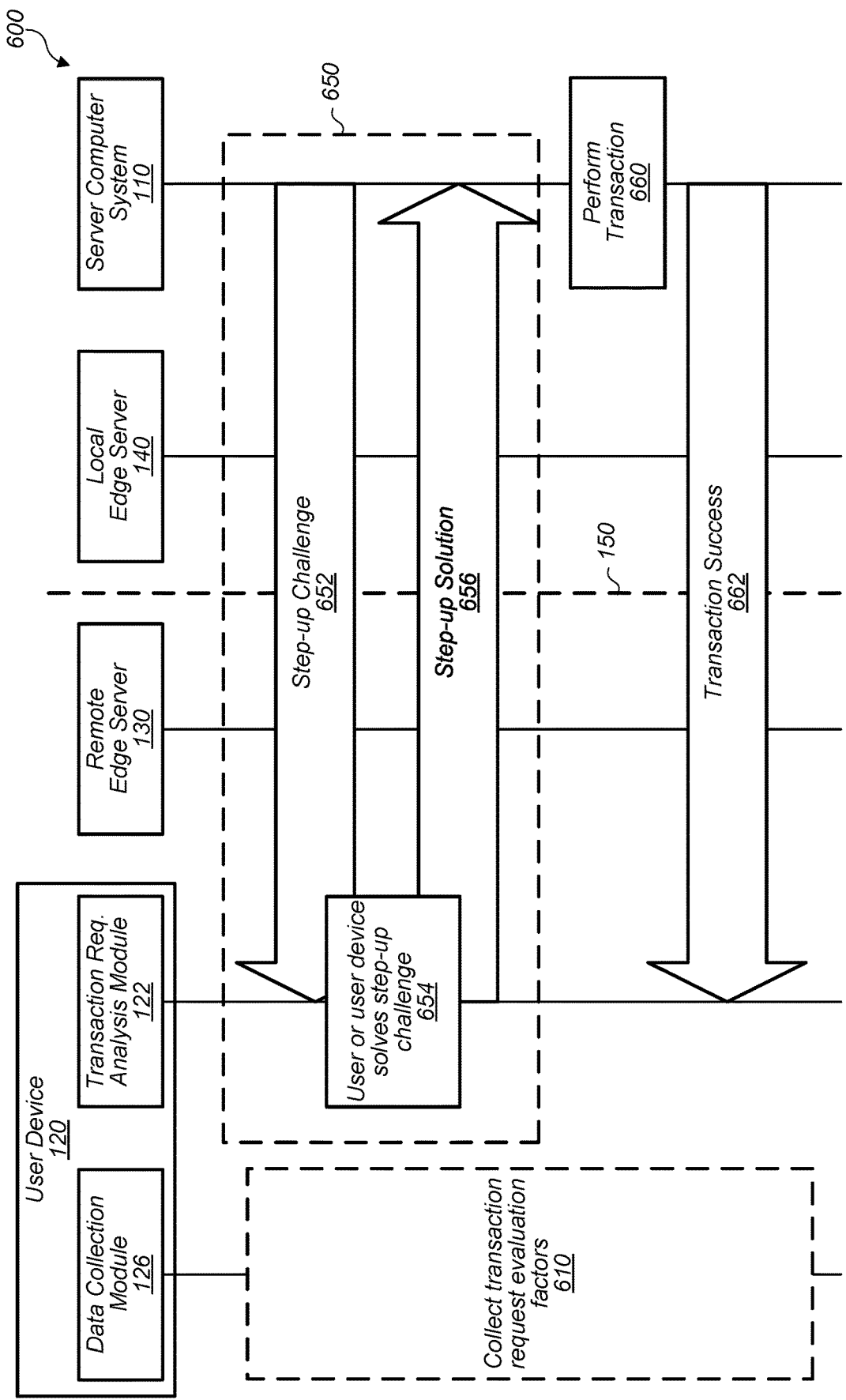

Referring now to FIG. 6D, at block 650, a step-up operation is performed. A step-up challenge is sent from server computer system 110 to user device 120 (arrow 652). At block 654, depending on the type of step-up challenge, user 104 solves the step-up challenge or user device 120 solves the step-up challenge. After the step-up challenge is solved, a message is sent to server computer system 110 with the step-up solution (arrow 656). Server computer system 110 then checks the step-up solution to determine whether the grant transaction request 102. In some embodiments, the step-up challenge is a request for additional information from user 104 (e.g., a secondary password, a request to input a one-time password sent via a secondary channel or generated by another device or application, etc.). In other embodiments, however, the step-up challenge is performed by user device 120 performing additional data collection and user device 120 or an edge server 130, 140 performing additional scoring (e.g., user device 120 collects additional transaction request evaluation factors and applies them to user device portion 124 to generate additional user device scores). As discussed above, in some contexts typical method for distributing one-time passwords may be cumbersome in some settings, or require server computer system 110 to receive sensitive information (e.g., a personal phone number of a user 104 to use to send the one-time password). Accordingly, by using additional data collection and analysis using user device portion 124, computer system 100 may be operable to securely perform step-up operations without exposing sensitive information to server computer system 110.

Having granted transaction request 102 (with or without a step-up operation), server computer system 110 performs the requested transaction (block 660). As discussed above, this transaction may be a login, a financial transaction, or access to secured information or media. After the requested transaction is successfully completed, server computer system 110 sends an indication to user device 120 that the transaction was successfully completed (arrow 662).

Figure 7:
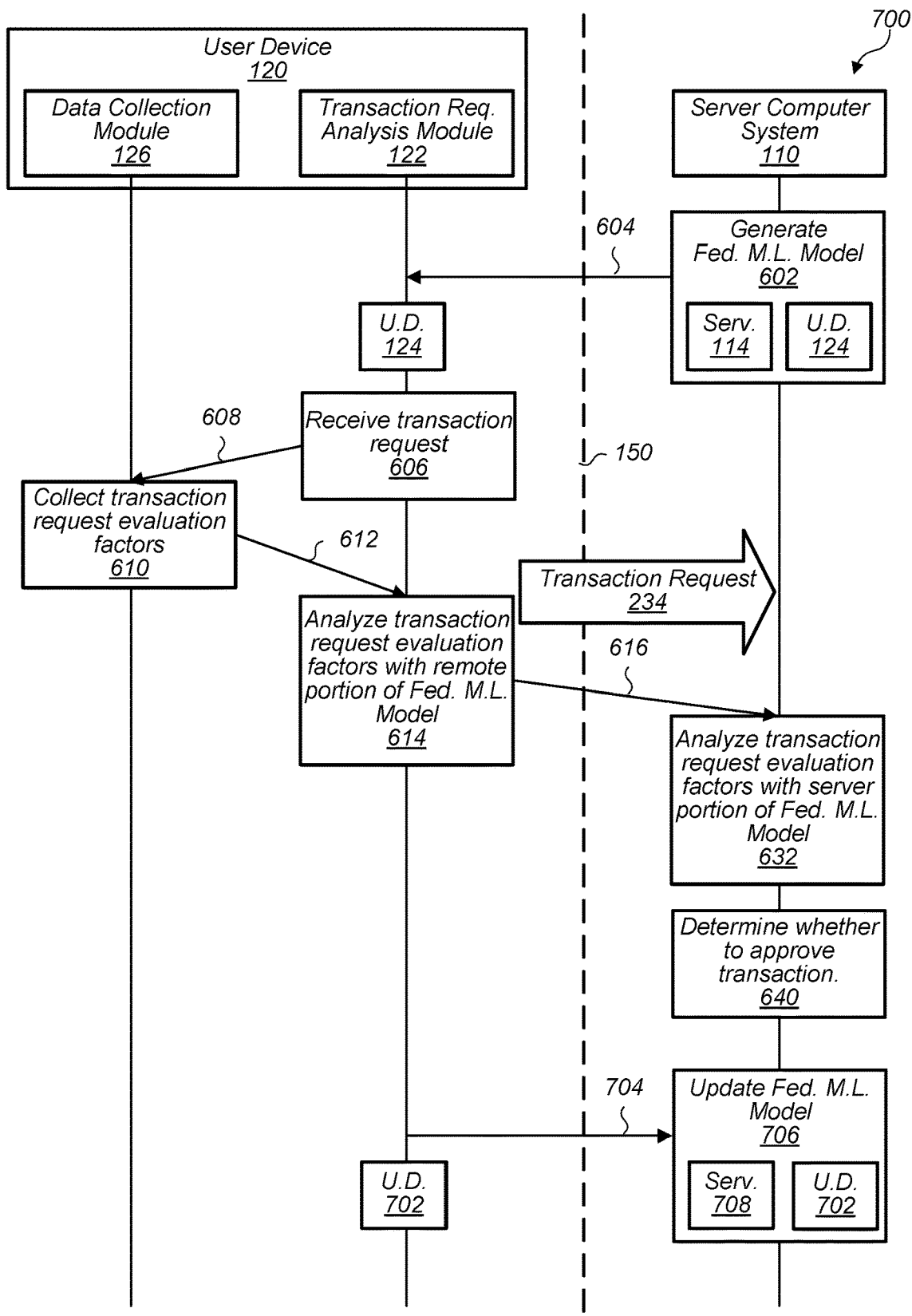
FIG. 7 is a flowchart illustrating various embodiments of a transaction request evaluation method using a federated machine learning model that is implemented using the user device and the server computer system of FIG. 1 in accordance with various embodiments.

Examples of Use of the Federated Machine Learning Model Multi-Factor Authentication Referring now to FIG. 7, a flowchart illustrates an example transaction request evaluation method 700 using a federated machine learning model 400 that is implemented using user device 120 and server computer system 110. Method 700 includes various elements discussed in FIGS. 6A-6D, but neither edge server 130, 140 is shown because edge servers 130, 140 are not used to evaluate transaction request 102 in method 700. In method 700, server computer system 110 generates federated machine learning model 400 (block 602) and distributes user device portion 124 to user device 120 (line 604). Blocks 606, 610, 614, and 632 (and the lines 608, 612, and 616 connecting them) proceed in the same manner as FIGS. 6A-6D. At block 640, server computer system 110 determines whether to grant transaction request 102. In method 700, no step-up operation is performed, and block 660 and arrow 662 are omitted for brevity.

After analyzing transaction request 102, user device portion 124 has been revised to become revised user device portion 702. At arrow 704, user device 120 sends an indication of revised user device portion 702 (e.g., revised model weights) to server computer system 110. At block 706, server computer system 110 uses revised user device portion 702 to update federated machine learning model 400 (e.g., using modules 412 and 414). In some embodiments, such updating results in a revised server device portion 708 and revised user device portion 702 being used as an updated federated machine learning model 400 to evaluation subsequent transitions. As discussed above, revised user device portion 702 may also be used to generate headstart models (discussed in connection to FIG. 5B) that can be sent to a second user device 120.

For example, the process of method 700 may be performed by a particular user device 120 that a particular user 104 desires to use to log in to an application provided by server computer system 110. In this example, two weeks prior to the login request from user 104, server computer system 110 distributes user device portion 124 to the particular user device 120 when user 104 caused transaction request analysis module 122 to be installed with the application provided by server computer system 110. A headstart model was used to initialize the user device portion 124 on the particular user device 120. User 104 has previously used user device 120 to successfully log in two times since installing the application prior to inputting the current login request. At block 606, the particular user 104 enters the login request (e.g., a transaction request 102), including their username and password.

As discussed above, the username and password are usable to establish a knowledge factor, but server computer system 110 requires at least a second factor be established as well before a login request is granted. The particular user device 120 has collected user behavior information and user device information over the last two weeks (block 610) and this collected information is applied to the user device portion 124 to generate user device scores (block 614). User device 120 sends personally identifiable transaction request evaluation factors and user device scores 230 to server computer system 110 (line 616). After receiving the user device score 230 and performing additional scoring by applying the received transaction request evaluation factors to server portion 114, server computer system 110 is able to establish an inherence factor and grants the login request. Subsequently, server computer system 110 incorporates the particular user device's 120 revised user device portion 702 into federated machine learning model 400 and uses the revised user device portion 702 to generate a headstart model that is sent to a second user device 120.

Step-Up Operations Using Federated Machine Learning Models

Figure 8:
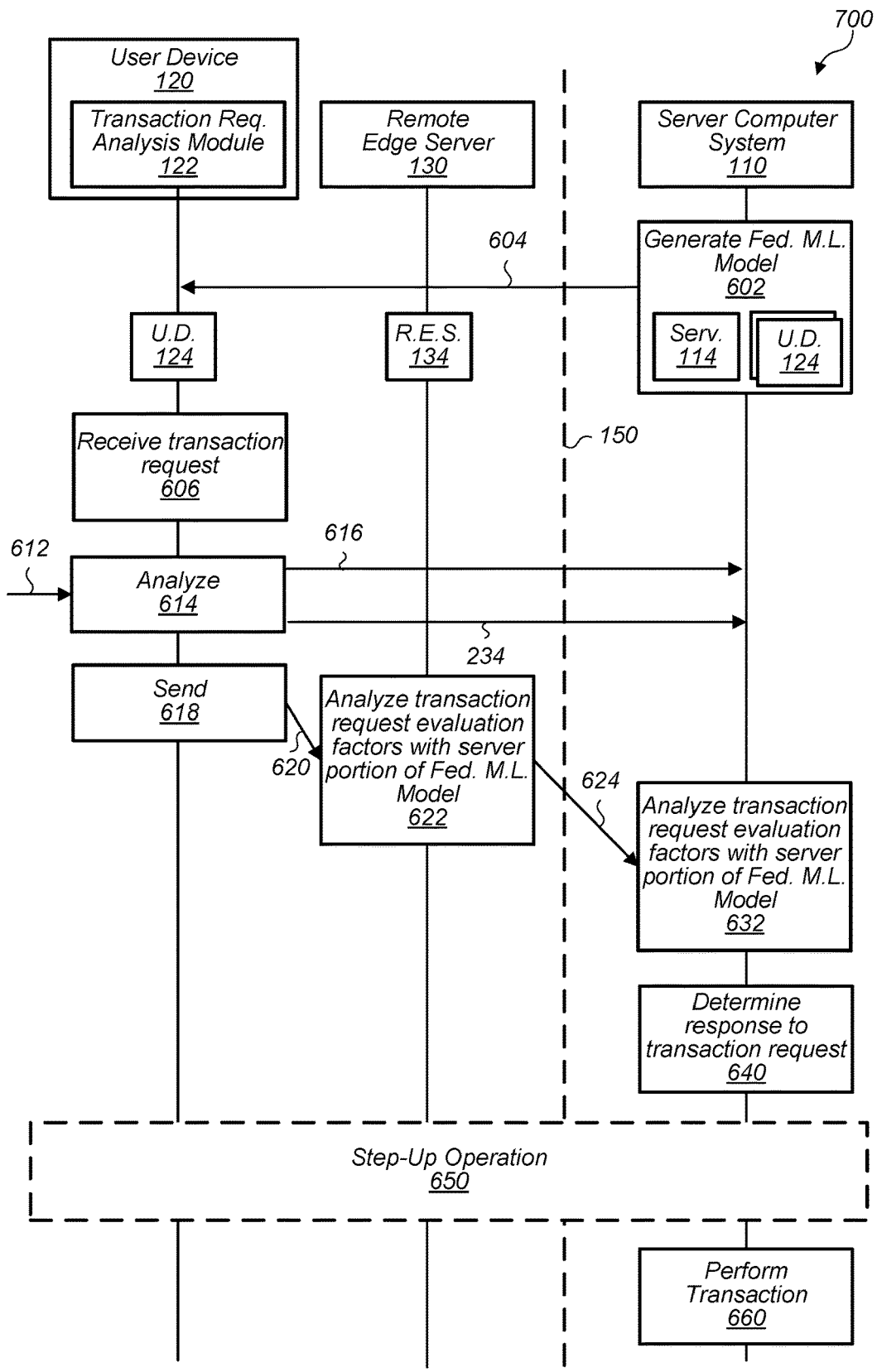
FIG. 8 is a flowchart illustrating various embodiments of a transaction request evaluation method using a federated machine learning model that is implemented using the user device, the remote edge server, and the server computer system of FIG. 1 in accordance with various embodiments.

Referring now to FIG. 8, a flowchart illustrates an example transaction request evaluation method 800 using a federated machine learning model 400 that is implemented using user device 120, remote edge server 130, and server computer system 110. Method 800 includes various elements discussed in FIGS. 6A-6D, but local edge server 140 is not shown because local edge server 140 is not used to evaluate transaction request 102 in method 800. In method 800, server computer system 110 generates federated machine learning model 400 (block 602) and distributes user device portion 124 to user device 120 and remote edge server portion 134 to remote edge server 130 (line 604). Transaction request 102 is received at block 606. Transaction request evaluation factors (collected by data collection module 126 which is omitted from FIG. 8) are received by transaction request analysis module 122 (line 612) and analyzed using user device portion 124 (block 614). User device scores 230 and transaction request evaluation factors are sent to server computer system 110 (line 616) along with an indication of transaction request 234. At block 618, transaction request evaluation factors are sent to remote edge server 130 (line 620). At block 622, the received transaction request evaluation factors are analyzed using remote edge server portion 134. Edge server scores 310 are sent to server computer system 110 (line 624). At block 640, server computer system 110 determines whether to grant transaction request 102 and determines to perform a step-up operation. Step-up operation is performed (block 650), and after server computer system 110 determines that the step-up operation has been successfully performed, the transaction is performed (block 660).

As discussed above, the step-up operation may require asking user 104 for additional authentication information such as additional passwords, answering security questions, or performing an image recognition check. In other embodiments, however, the step-up operation is performed behind the scenes using additional transaction request evaluation factors and additional scoring.

For example, the process of method 800 may be performed by a particular user device 120 that a particular user 104 uses to perform tasks for their employer ABC Corp, an enterprise with hundreds of workers. Prior to allowing particular user 104 to perform a task that imposes a certain level of risk (e.g., before performing a financial transaction for $10,000 or more), server computer system 110 requires a step-up operation. Transaction request analysis module 122 is installed on the particular user device 120 as well as hundreds of other user devices that are associated with ABC Corp. Additionally, ABC Corp. has transaction request analysis module 300 on the remote edge server 310 that serves the ABC Corp office where particular user 104 works. To avoid privacy concerns, ABC Corp does not allow personally identifiable information about employees to go beyond network boundary 150. When particular user 104 submits a $20,000 transaction request as part of their job, to the particular user 104 it does not appear that additional authentication information was needed to perform the task.

In the background, however, personally identifiable information about particular user 104 has been collected by particular user device 120 and was scored by the user device portion 124 installed on the particular user device 120. Other personally identifiable information was scored by the transaction request analysis module 300 on the remote edge server 310 that serves the ABC Corp office. The user device scores 230 and edge server score 310 were not sufficient for server computer system 110 to allow the transaction request without a step-up, however, so a step-up operation was performed involving additional data collection about particular user 104 and their coworkers. After the step-up operation is completed, server computer system 110 determines no material deviation is present for the particular user's 104 transaction request and grants the transaction. Thus, particular user 104 did not have to solve a step-up operation and sensitive information was able to be used to evaluate transaction request 102 without the particular user's 104 personally identifiable information being sent to server computer system 110.

Training, Distributing, and Using a Federated Machine Learning Model

Figure 9:
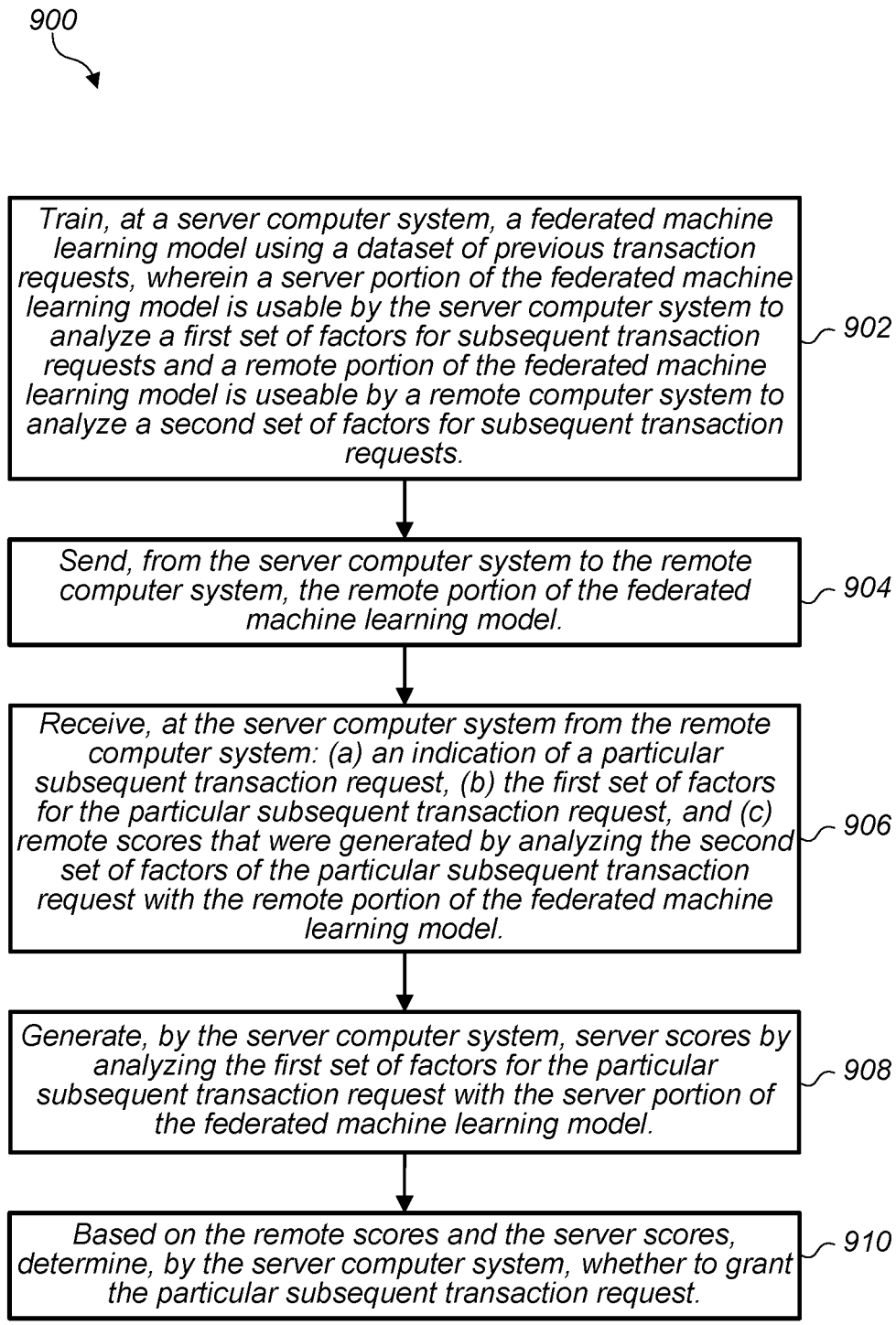
FIG. 9 is flowchart illustrating an embodiment of a server computer system portion of a transaction request evaluation method in accordance with the various embodiments.

FIG. 9 is flowchart illustrating an embodiment of a server computer system portion 900 of a transaction request evaluation method in accordance with the various embodiments. In the embodiment shown in FIG. 9, the various actions associated with portion 900 are implemented by server computer system 110.

At block 902, server computer system 110 trains a federated machine learning model 400 using a dataset of previous transaction requests (e.g., stored in transaction datastore 430), A server portion 114 of the federated machine learning model 400 is usable by the server computer system 110 to analyze a first set of factors for subsequent transaction requests 102 and a remote portion (e.g., a user device portion 124, a remote edge server portion 134) of the federated machine learning model 400 is useable by a remote computer system (e.g., a user device 120, a remote edge server 130) to analyze a second set of factors for subsequent transaction requests 102. At block 904, server computer system 110 sends the remote portion of the federated machine learning model 400 to the remote computer system.

At block 906, server computer system receives from the remote computer system: (a) an indication of a particular subsequent transaction request 234, (b) the first set of factors for the particular subsequent transaction request 102 (e.g., line 616 in FIG. 6A, line 624 in FIG. 6B), and (c) remote scores (e.g., user device scores 230, edge server scores 310) that were generated by analyzing the second set of factors of the particular subsequent transaction request 102 with the remote portion of the federated machine learning model 400. At block 908, server computer system 110 generates server scores (e.g., server scores 500) by analyzing the first set of factors for the particular subsequent transaction request 102 with the server portion 114 of the federated machine learning model. At block 901, based on the remote scores and the server scores, server computer system 110 determines whether to grant the particular subsequent transaction request 102.

Receiving and Using a Remote Portion of a Federated Machine Learning Model

Figure 10:
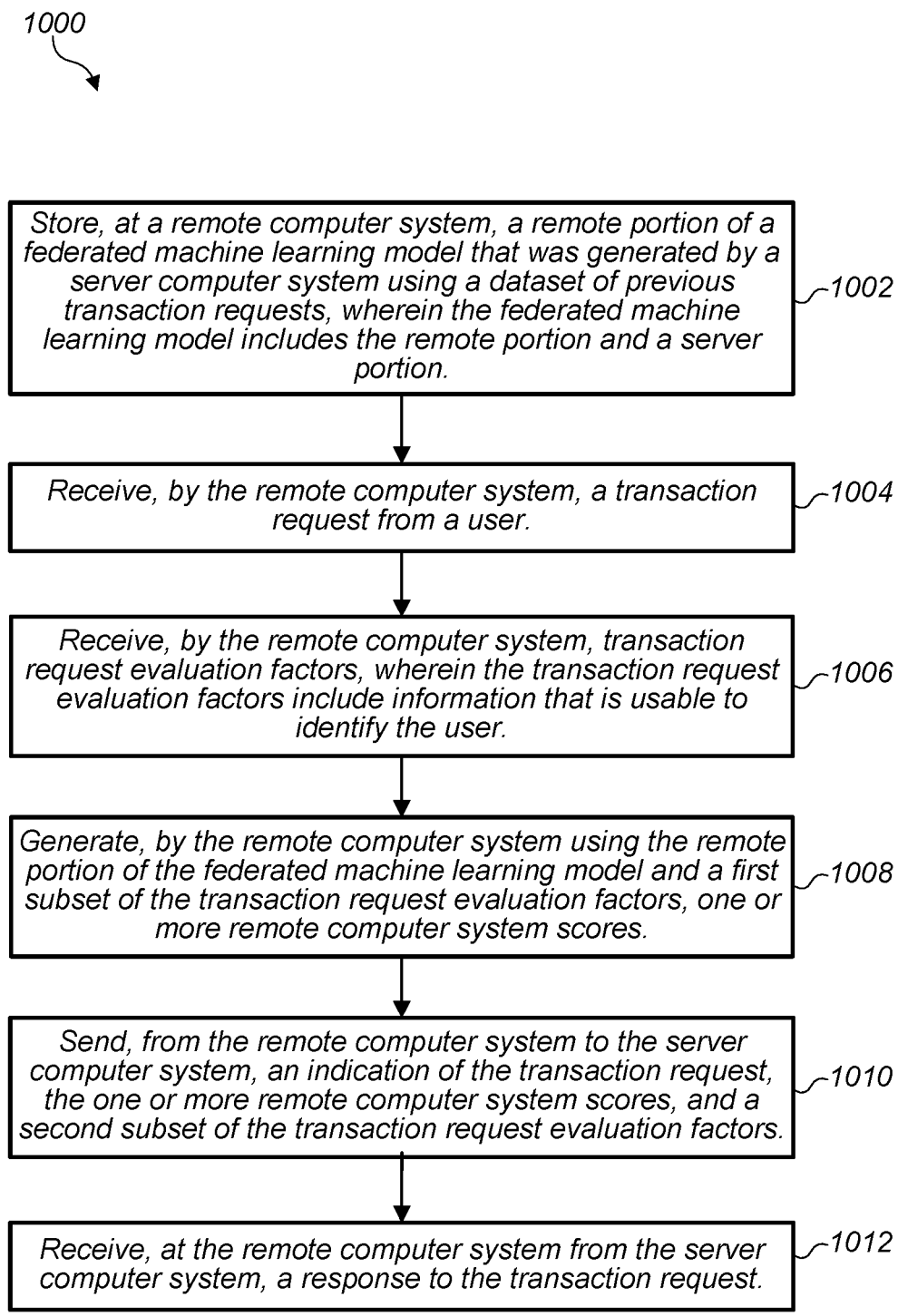
FIG. 10 is flowchart illustrating an embodiment of a remote computer system portion of a transaction request evaluation method in accordance with the various embodiments.

FIG. 10 is flowchart illustrating an embodiment of a remote computer system portion 1000 of a transaction request evaluation method in accordance with the various embodiments. In the embodiment shown in FIG. 10, the various actions associated with portion 1000 are implemented by user device 120 or remote edge server 130.

At block 1002, a remote computer system (e.g., user device 120, remote edge server 130) stores a remote portion (e.g., a user device portion 124, a remote edge server portion 134) of a federated machine learning model 400 that was generated by a server computer system 110 using a dataset of previous transaction requests. The federated machine learning model 400 includes at least the remote portion and a server portion 114. At block 1004, the remote computer system receives a transaction request 102 from a user 104. At block 1006, the remote computer system receives transaction request evaluation factors (e.g., line 612 of FIG. 6A, line 620 of FIG. 6B). The transaction request evaluation factors include information that is usable to identify the user 104.

At block 1008, remote computer system generates, using the remote portion of the federated machine learning model 400 and a first subset of the transaction request evaluation factors, one or more remote computer system scores (e.g., user device scores 230, edge server scores 310). At block 1010, the remote computer system sends to the server computer system 110, an indication of the transaction request 234, the one or more remote computer system scores, and a second subset of the transaction request evaluation factors (e.g., line 616 in FIG. 6A, line 624 in FIG. 6B). At block 1012, the remote computer system receives a response to the transaction request 102 from the server computer system 110.

Exemplary Computer System

Figure 11:
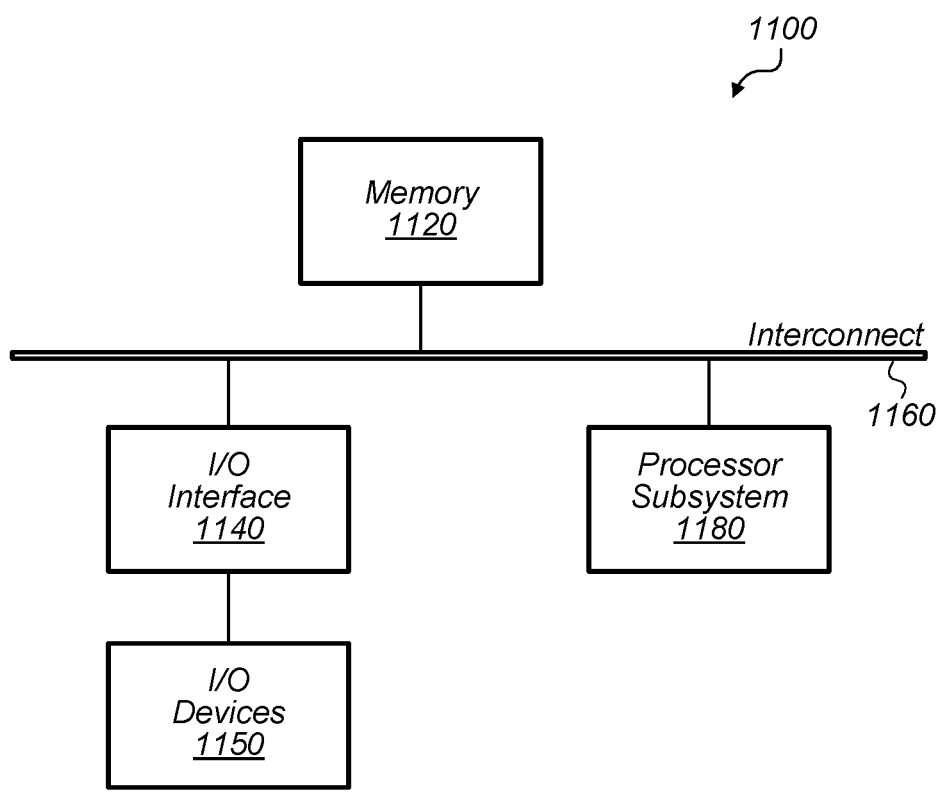
FIG. 11 is a block diagram of an exemplary computer system, which may implement the various components of FIGS. 1-4.

Turning now to FIG. 11, a block diagram of an exemplary computer system 1100, which may implement the various components of computer system 100 (e.g., server computer system 110, user device 120, remote edge server 130, local edge server 140) is depicted. Computer system 1100 includes a processor subsystem 1180 that is coupled to a system memory 1120 and I/O interfaces(s) 1140 via an interconnect 1160 (e.g., a system bus). I/O interface(s) 1140 is coupled to one or more I/O devices 1150. Computer system 1100 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 1100 is shown in FIG. 11 for convenience, system 1100 may also be implemented as two or more computer systems operating together.

Processor subsystem 1180 may include one or more processors or processing units. In various embodiments of computer system 1100, multiple instances of processor subsystem 1180 may be coupled to interconnect 1160. In various embodiments, processor subsystem 1180 (or each processor unit within 1180) may contain a cache or other form of on-board memory.

System memory 1120 is usable to store program instructions executable by processor subsystem 1180 to cause system 1100 perform various operations described herein. System memory 1120 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1100 is not limited to primary storage such as memory 1120. Rather, computer system 1100 may also include other forms of storage such as cache memory in processor subsystem 1180 and secondary storage on I/O Devices 1150 (e.g., a hard drive, storage array, etc.). In some embodiments, these other forms of storage may also store program instructions executable by processor subsystem 1180.

I/O interfaces 1140 may be any of various types of interfaces configured to couple to and communicate with other devices, according to various embodiments. In one embodiment, I/O interface 1140 is a bridge chip (e.g., Southbridge) from a front-side to one or more back-side buses. I/O interfaces 1140 may be coupled to one or more I/O devices 1150 via one or more corresponding buses or other interfaces. Examples of I/O devices 1150 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1100 is coupled to a network via a network interface device (e.g., configured to communicate over WiFi, Bluetooth, Ethernet, etc.), another example of an I/O device 1150.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A user device comprising:
a computer processor circuit; and
a computer memory circuit storing instructions that when executed by the computer processor circuit cause the user device to perform operations including:
receiving a user device portion of a federated machine learning model that was generated by a server computer system using a dataset of previous transaction requests, wherein the federated machine learning model includes the user device portion and a server portion;
receiving a transaction request from a user;
collecting (a) user behavior information about how the user has used the user device and (b) transaction information about a transaction requested by the transaction request;
generating, using the user device portion of the federated machine learning model and the user behavior information, one or more user device scores by applying the user behavior information to the federated machine learning model;
sending, to the server computer system, an indication of the transaction request, the one or more user device scores, and the transaction information; and
receiving, from the server computer system, a response to the transaction request.

2. The user device of claim 1, wherein the operations further include:
training the user device portion using the user behavior information; and
wherein generating the one or more user device scores includes generating an indication of whether user behavior in a period of time before receiving the transaction request has deviated from a previous trend in user behavior.

3. The user device of claim 1,
wherein the collecting includes collecting (c) user device information;
wherein generating the one or more user device scores includes applying the user device information to the federated machine learning model; and
wherein the user behavior information and device information used to generate the one or more user device scores is not sent from the user device to another computer system.

4. The user device of claim 3, wherein the operations further include:
sending, from the user device to an edge server, user behavior information and device information that was not used to generate the one or more user device scores.

5. The user device of claim 1,
wherein the one or more user device scores are generated periodically and independent from receiving the transaction request.

6. The user device of claim 1,
wherein the collecting includes (c) collecting biometric information about the user of the user device;
wherein generating the one or more user device scores includes applying indications of the biometric information to the federated machine learning model; and
wherein biometric information is not sent from the user device to another computer system.

7. The user device of claim 1, wherein the operations further comprise:
receiving a step-up challenge from the server computer system;
receiving a solution to the step-up challenge from the user; and
sending an indication of the solution to the step-up challenge to the server computer system.

8. A method comprising:
storing, at a remote computer system, a remote portion of a federated machine learning model that was generated by a server computer system using a dataset of previous transaction requests, wherein the federated machine learning model includes the remote portion and a server portion;
receiving, by the remote computer system, a transaction request from a user;
receiving, by the remote computer system, transaction request evaluation factors, wherein the transaction request evaluation factors include information that is usable to identify the user;
generating, by the remote computer system using the remote portion of the federated machine learning model and a first subset of the transaction request evaluation factors, one or more remote computer system scores;
sending, from the remote computer system to the server computer system, an indication of the transaction request, the one or more remote computer system scores, and a second subset of the transaction request evaluation factors; and
receiving, from the server computer system, a response to the transaction request.

9. The method of claim 8,
wherein the remote computer system is a user device; and
wherein receiving the transaction request evaluation factors includes using the user device to collect the transaction request evaluation factors.

10. The method of claim 9,
wherein the user device includes a safe list of software approved to collect and analyze information that is usable to identify a user without permission from the user;
wherein the transaction request evaluation factors are collected by authentication software running on the user device;
wherein the first subset of the transaction request evaluation factors includes information that is usable to identify the user; and
wherein at least some of the information that is usable to identify the user is not sent from the user device to another computer system.

11. The method of claim 10, further comprising:
sending, from the user device to an edge server, a portion of the information that is usable to identify the user.

12. The method of claim 8,
wherein the remote computer system is an edge server; and
wherein receiving the transaction request evaluation factors includes receiving the transaction request evaluation factors from a user device.

13. The method of claim 12,
wherein the federated machine learning model includes a user device portion that was previously sent to the user device via the edge server;
the method further comprising:
receiving, at the edge server from the user device, one or more user device scores generated by the user device using the user device portion of the federated machine learning model and a third subset of transaction request evaluation factors that was collected by the user device but not sent to the edge server; and
sending, from the edge server to the server computer system, the one or more user device scores.

14. The method of claim 12,
wherein the first subset of the transaction request evaluation factors is not sent from the edge server to the server computer system.

15. The method of claim 8, wherein the response to the transaction request is sending a step-up challenge, the method further comprising:
receiving, at the remote computer system, a step-up challenge from the server computer system;
receiving, at the remote computer system a solution to the step-up challenge from the user; and
sending an indication of the solution to the step-up challenge to the server computer system.

16. A method comprising:
storing, at a user device, a user device portion of a federated machine learning model that was generated by a server computer system using a dataset of previous transaction requests, wherein the federated machine learning model includes the user device portion and a server portion;
receiving, at the user device, a transaction request from a user;
collecting, by the user device, (a) user behavior information about how the user has used the user device, (b) user device information, and (c) transaction information about a transaction requested by the transaction request;
generating, by the user device using the user device portion of the federated machine learning model and the user behavior information, one or more user device scores by applying the user behavior information and user device information to the federated machine learning model;
sending, from the user device to the server computer system, an indication of the transaction request, the one or more user device scores, and the transaction information; and
receiving, at the user device from the server computer system, a response to the transaction request.

17. The method of claim 16, further comprising:
receiving, at the user device from the server computer system, an updated user device portion of the federated machine learning model, wherein the user device portion was generated based on ground truth indications for one or more transaction requests analyzed using the federated machine learning model.

18. The method of claim 16, further comprising:
sending, from the user device to an edge server, user behavior information and user device information that was collected by the user device but was not used to generate the one or more user device scores;
wherein user behavior information and user device information that was used to generate the one or more user device scores is not sent to another computer system.

19. The method of claim 16,
wherein the transaction request includes a knowledge authentication factor for the transaction requested by the transaction request; and wherein the one or more user device scores are useable to determine whether a second authentication factor is established for the transaction requested by the transaction request.

20. The method of claim 16 wherein the response to the transaction request is sending a step-up challenge, the method further comprising:

receiving, at the user device, a step-up challenge from the server computer system;

receiving, at the user device a solution to the step-up challenge from the user; and sending, from the user device, an indication of the solution to the step-up challenge to the server computer system.

* * * * *